(12) United States Patent
Seki

(10) Patent No.: US 6,315,020 B1
(45) Date of Patent: Nov. 13, 2001

(54) LAMINATING APPARATUS

(75) Inventor: Takao Seki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/525,944

(22) Filed: Mar. 15, 2000

(30) Foreign Application Priority Data

Mar. 17, 1999 (JP) .................................... 11-071586
Mar. 24, 1999 (JP) .................................... 11-079868

(51) Int. Cl.$^7$ .................................................. B30B 15/00
(52) U.S. Cl. .................. 156/351; 156/353; 156/364; 156/366; 156/368; 156/522; 156/555
(58) Field of Search ...................... 156/351, 353, 156/362, 363, 364, 366, 367, 368, 494, 495, 510, 516, 522, 555, 582

(56) References Cited

U.S. PATENT DOCUMENTS

| | | | |
|---|---|---|---|
| 5,571,368 | * 11/1996 | Barge | 156/359 |
| 5,584,962 | * 12/1996 | Bradshaw et al. | 156/495 |
| 5,639,339 | * 6/1997 | Couillard | 156/555 |
| 5,853,531 | * 12/1998 | Murphy et al. | 156/555 |
| 5,888,342 | * 3/1999 | Reinders | 156/494 |
| 5,961,779 | * 10/1999 | Bradshaw | 156/495 |

FOREIGN PATENT DOCUMENTS

| | | |
|---|---|---|
| 11-245296 | 9/1999 | (JP) . |
| 11-245297 | 9/1999 | (JP) . |
| 11-245299 | 9/1999 | (JP) . |
| 11-348119 | 12/1999 | (JP) . |
| 2000-37775 | 2/2000 | (JP) . |

\* cited by examiner

*Primary Examiner*—James Sells
(74) *Attorney, Agent, or Firm*—Oliff & Berridge, PLC

(57) ABSTRACT

A laminating apparatus 1 is controlled in the following manner: if power supply from a utility power source through a power supply part 85 is started (S1:YES), a cold flag 72B is set to the on state (S2); if opening of a cover 13 causes a cassette sensor 56 to turn on from on (S11:YES, S12:YES), a cassette replacement flag 72A is set to the on state (S13); and if the flag 72B or 72A is in an on state (S14:YES, S15:YES) at power-on of the apparatus 1 by a power switch 17 (S5:YES), a slack removal processing is performed on a first and second sheets 27 and 29 (S7, S16–S19).

26 Claims, 19 Drawing Sheets

FIG.4
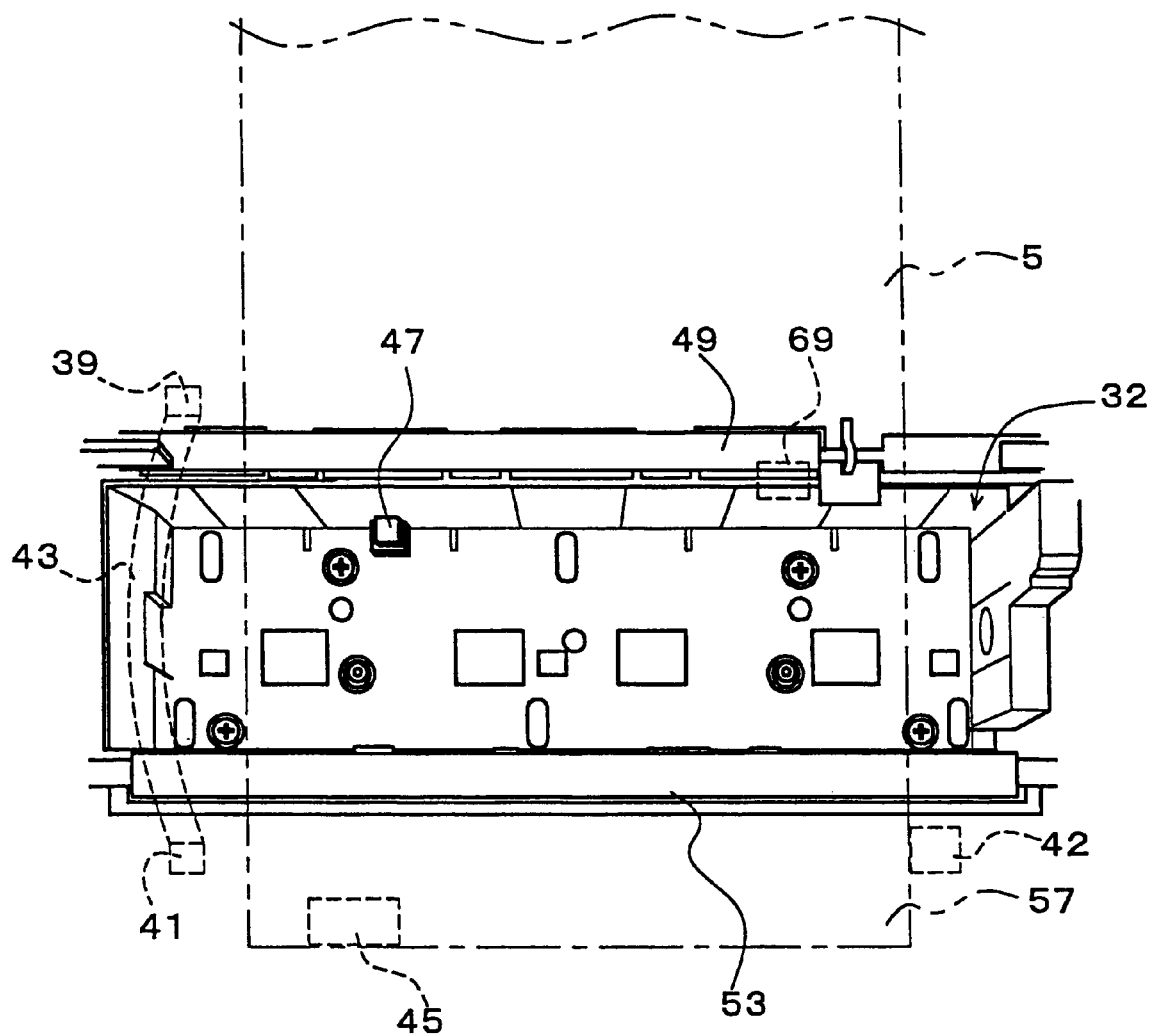
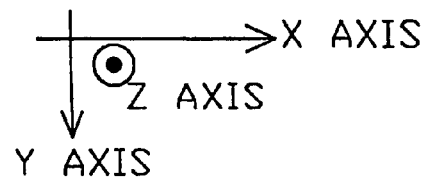

LAMINATING APPARATUS

BACKGROUND OF THE INVENTION

1. Field of the Invention

The present invention relates to a laminating apparatus in which a sheet is fed from each of a pair of sheet rolls and a medium such as a paper, a document, a card is sandwiched between the fed sheets to produce a laminate. In particular, the present invention relates to a laminating apparatus which performs a slack removal operation in the minimum area required to remove slack generated in the sheets unreeled from the sheet rolls, so that the medium can be laminated to produce an aesthetic laminate without any wrinkles between the sheets and the medium.

Furthermore, the present invention relates to a laminating apparatus capable of producing a laminate by coating a medium such as a document, a card, and the like with coating materials such as a synthetic resin film and the like and, particularly, to a laminating apparatus capable of simplifying the steps of producing a laminate to suppress labors or loads exerted on a user.

2. Description of Related Art

Laminating apparatus are mainly classified under the following types: one is a hot laminating type of unreeling two sheets from a pair of sheet rolls, sandwiching a medium such as a card between the fed sheets, and hot-pressing them to produce a laminate; and another is a cold laminating type of unreeling two sheets from a pair of sheet rolls, at least one or both of the sheets being applied with an adhesive, and adhesively sandwiching a medium such as a card between the fed sheets to produce a laminate.

Between the above two types, the latter cold type of laminating apparatus is becoming in common use because it needs no heating means such as a hot roller and thus it is easy to handle.

Such the cold type of laminating apparatus is exemplified in FIGS. 18A, 18B and 19. In those drawings, a laminating apparatus 100 is basically configured by a medium supply area A, a sheet supply area B, a laminate formation area C, and a cutting area D. Specifically, the medium supply area A includes a feed tray 102 for holding thereon media 101 such as documents, cards, etc. to be supplied into the apparatus. The sheet supply area B includes a pair of sheet rolls 105, 106 for feeding sheets 103, 104 respectively used to laminate the medium 101. The laminate formation area C includes a pair of nip rollers 107, 108 for transporting the medium 101 fed from the medium supply area A in a Y-axis direction while laminating it between the sheets 103, 104 supplied from the sheet supply area B. The laminate 109 formed of the medium 110 and the sheets 103, 104 laminating the medium 110 therebetween is send out from the lamination processing area C in a Y-axis direction. The cutting area D includes a lateral cutter blade 110 for cutting the laminate 109 along the end edge in a width direction (X-axis direction) thereof perpendicular to the send-out direction (Y-axis direction).

The sheet supply area B is constructed of a sheet cassette 111 in which an upper roll 105 comprising a non-adhesive sheet 103 made of a synthetic region film such as a polyethylene terephthalate film (which is referred to as PET film hereinafter) and a lower roll 106 comprising an adhesive sheet 104 made of a PET film applied with an adhesive on one surface thereof so that the sheet 104 is rolled with the adhesive face inside. The rolls 105, 106 are rotatably mounted in the sheet cassette 111. The non-adhesive sheet 103 unreeled from the upper roll 105 and the adhesive sheet 104 unreeled from the lower roll 106 are supplied together to the laminate formation area C while the adhesive face of the sheet 104 is opposite to the sheet 103.

The feed tray 102 has a guide plate 112 for guiding the medium 101 to a nip position between the nip rollers 107, 209. The guide plate 112 is placed on the tray 102 at the end part thereof as shown in FIG. 19. The feed tray 102 is mounted to a main unit 113 so that the guiding portion defined by the guide plate 112 is inserted between the upper and lower sheet rolls 105 and 106 in the sheet cassette 111 mounted in the main unit 113.

The lateral cutter blade 110 is slidable supported on a bar 114 laid across the width of the main unit 113 at the side to which the laminate 109 is transported by the nip rollers 107, 108 as shown in FIGS. 18A and 18B and 19. When an arbitrary portion of the laminate 109 to be cut is advanced to the blade position, the blade 110 may be slid in the width (X-axis) direction to cut the laminate 109 along the end edge in the width direction at an arbitrary position in the send-out direction (Y-axis direction).

The laminating apparatus 100 constructed as above is used in the following manner. At first, when the medium 101 such as a card placed on the feed tray 102 is pushed forward, the front end of the medium 101 is guided to between the non-adhesive sheet 103 and the adhesive sheet 104 unreeled from the upper and lower rolls 105 and 106 respectively and to a nip position between the nip rollers 107 and 108.

At this time, when a handle 115 is attached to a side wall of the main unit 113 is rotated, the medium 101 is transported together with the sheets 103 and 104 into between the nip rollers 107 and 108 while laminating them, and sent out as the laminate 109. Thereafter, the laminate 109 is cut by means of the lateral cutter blade 110 in the width direction, thus providing a resultant laminate 109 constructed of the medium 101 whose both surfaces are covered by the sheets 103 and 104.

Meanwhile, when the non-adhesive sheet 103 and the adhesive sheet 104 are unreeled from the upper and lower rolls 105 and 106 respectively in the sheet cassette 111 used in the above-mentioned laminating apparatus 100 in the prior art, the sheets 103, 104 may have slack.

The rotation of the handle 115 is in direct conjunction with the rotation of the nip rollers 107, 108. Accordingly, this may cause the occurrence of slack in the sheets 103, 104 according to the manner of rotating the handle 115 by a user. If a mechanism of preventing backward rotation of the rollers 107, 108 is provided between the handle 115 and the rollers 107, 108, the sheets 103, 104 unreeled from the upper and lower rolls 105, 106 could be temporarily made tense, but not kept as stretched. This also would result in the occurrence of slack in the sheets 103, 104.

Such the slack in the sheets 103, 104 causes a jamming of the medium 101 and wrinkles in the same when laminated, thus resulting in a problem that the medium 101 can not be aesthetically laminated.

It is also conceivable that, every time when the medium 101 is laminated with the sheets 103, 104 to produce a laminate 109, the sheets 103, 104 are fed first by a predetermined length in order to remove the slack generated in the sheets 103, 104. This case may cause a wasteful consumption of the sheets 103, 104 and an increase in production cost of the laminate 109.

Furthermore, when the above-mentioned laminating apparatus 100 is used to produce a desired laminate 109, the medium or paper 101 placed on the feed tray 102 and the guide plate 112 is inserted to the nip position between the rollers 107, 108, and the handle 115 is rotated by the corresponding turns to the length in an Y-axis direction of the medium 101. By the nipping force of the rollers 107, 108, the non-adhesive sheet 103 and the adhesive sheet 104 are adhesively placed over the medium 101. Then, the lateral cutter blade 110 is made to scan the laminate 109 in the X-axis direction to provide the desired laminate 109. As mentioned above, a user should manually operate the apparatus 100 to produce the laminate 109 while confirming all of the producing steps. This gives extremely large labors and loads to the user.

In particular, in the case where the medium 101 is shorter in the extreme in the X-axis length than that of the sheets 103, 104, a user must cut later with scissors or a cutter the sheets 103, 104 that lie over the edge of the medium 101 formed as a laminate 109. Such the labors and loads exerted on the user are very serious problems.

SUMMARY OF THE INVENTION

The present invention has been made in view of the above circumstances and has to object to overcome the above problems and to provide a laminating apparatus capable of removing slack generated in the sheets unreeled from sheet rolls to minimize wasteful consumption of the sheets, preventing the occurrence of wrinkle in the medium or sheets, and aesthetically laminating the medium.

Another object of the present invention is providing a laminating apparatus capable of simplifying the steps needed to produce a laminate and producing a laminate according to a medium to be laminated, thereby to reduce labors or loads exerted on a user.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a laminating apparatus for producing a laminate by unreeling sheets from a sheet roll containing long lengths of rolled sheet, and laminating the sheet on a document medium, while feeding the laminated sheet and document medium, the apparatus including: a controller for controlling the laminating apparatus; a power supply part for supplying power to the controller; a sheet roll holding part for holding the sheet roll; a sheet roll detecting part for detecting mounting and dismounting of the sheet roll with respect to the sheet roll holding part; a first flag memory that is set when the power supply part starts supplying power to the controller; a second flag memory that is set when the sheet roll detecting part detects the mounting and dismounting of the sheet roll; and a slack removing device that performs a slack removing operation to remove slack generated in the sheet unreeled from the sheet roll only if the first or second flag memory has been set.

In the above laminating apparatus, the operation of removing slack from the sheet roll is performed by means of the slack removing device only if the first flag memory is set to an on state at the start of power supply from the power supply part to the control part, or if the second flag memory is set to the on state at the detection of dismounting and mounting of the sheet roll by the sheet roll detector. Accordingly, the slack removing device is operated to conduct the slack removing operation with respect to the sheet roll only when the first or second flag has been set to the on state, so that a wasteful consumption of the sheets can be prevented. Also, the occurrence of wrinkles in the sheet and the document medium can be prevented, to aesthetically laminate the medium.

According to another aspect of the present invention, there is provided a laminating apparatus for producing a laminate by laminating sheets on both faces of a document medium, the apparatus including: a document medium feeding part for supplying the document medium into a main body of the laminating apparatus; a laminate feeding part for laminating the sheets on both faces of the document medium to form a laminate while feeding the laminate in a predetermined feeding directing; a first detecting part disposed near the document medium feeding part, for detecting presence of the document medium fed by the document medium feeding part; a first cutting part disposes downstream from the laminate feeding part along the feeding direction, the first cutting part being movable in a direction of a width of the laminate, perpendicular to the feeding direction, to determine a cutting position of the laminate, and the first cutting part cutting the laminate in the feeding direction; a second cutting part disposed downstream from the laminate feeding part along the feeding direction, the second cutting part setting a cutting position of the laminate based on a detection result of the first detecting part and cutting the laminate in the width direction; and at least a drive motor for actuating the document medium feeding part, the laminate feeding part, and the second cutting part.

In the above apparatus, the document medium feeding part, the laminate feeding part, and the second cutting part are operated by means of the drive motor to feed the document medium and/or the laminate and then cut the laminate based the detection result of the first detecting part. Accordingly, with the laminating apparatus constructed as above, a user does not need to manually operate a handle and the like while visually observing all the steps of producing the laminate. Thus, labors and loads which would be exerted on the user can be reduced.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 4 is an enlarged top view of a sheet cassette holding part of the laminating apparatus;

DETAILED DESCRIPTION OF THE PREFERRED EMBODIMENTS

A detailed description of preferred embodiments of a laminating apparatus embodying the present invention will now be given referring to the accompanying drawings.

Figure 1:
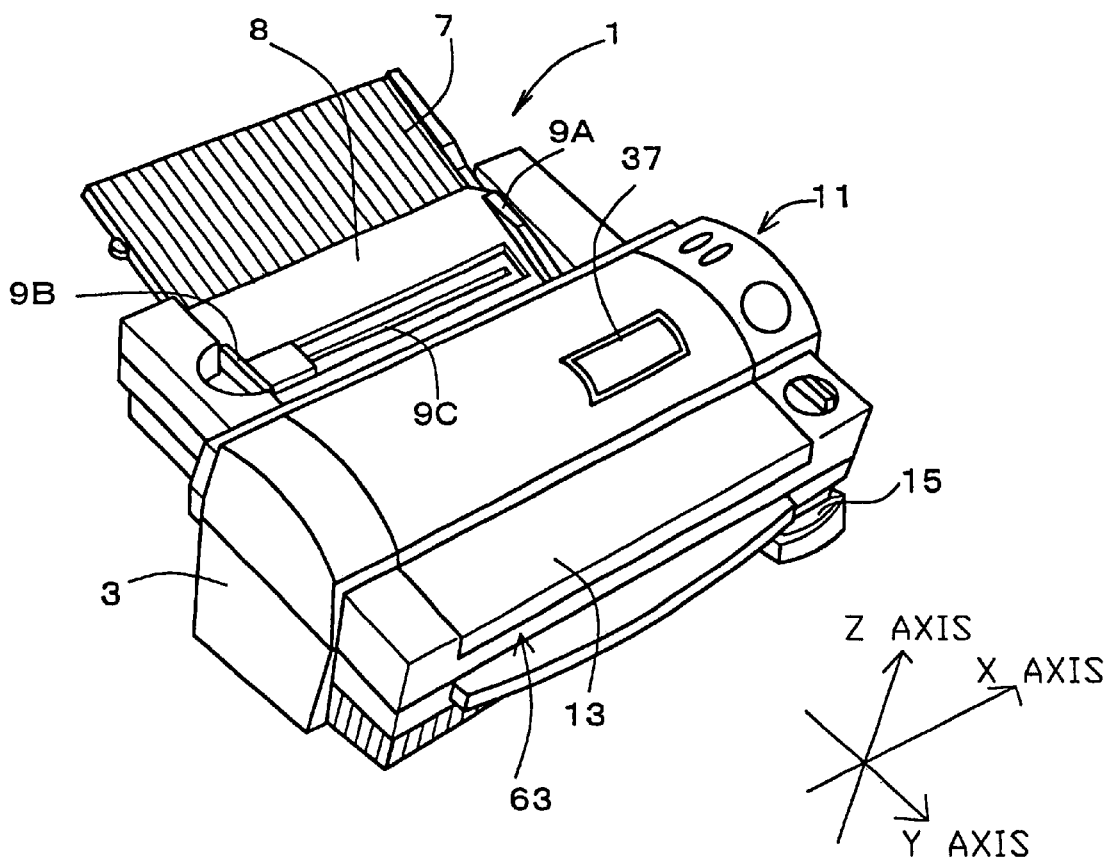
FIG. 1 is a perspective view of a laminating apparatus in a first embodiment according to the present invention.
Figure 2:
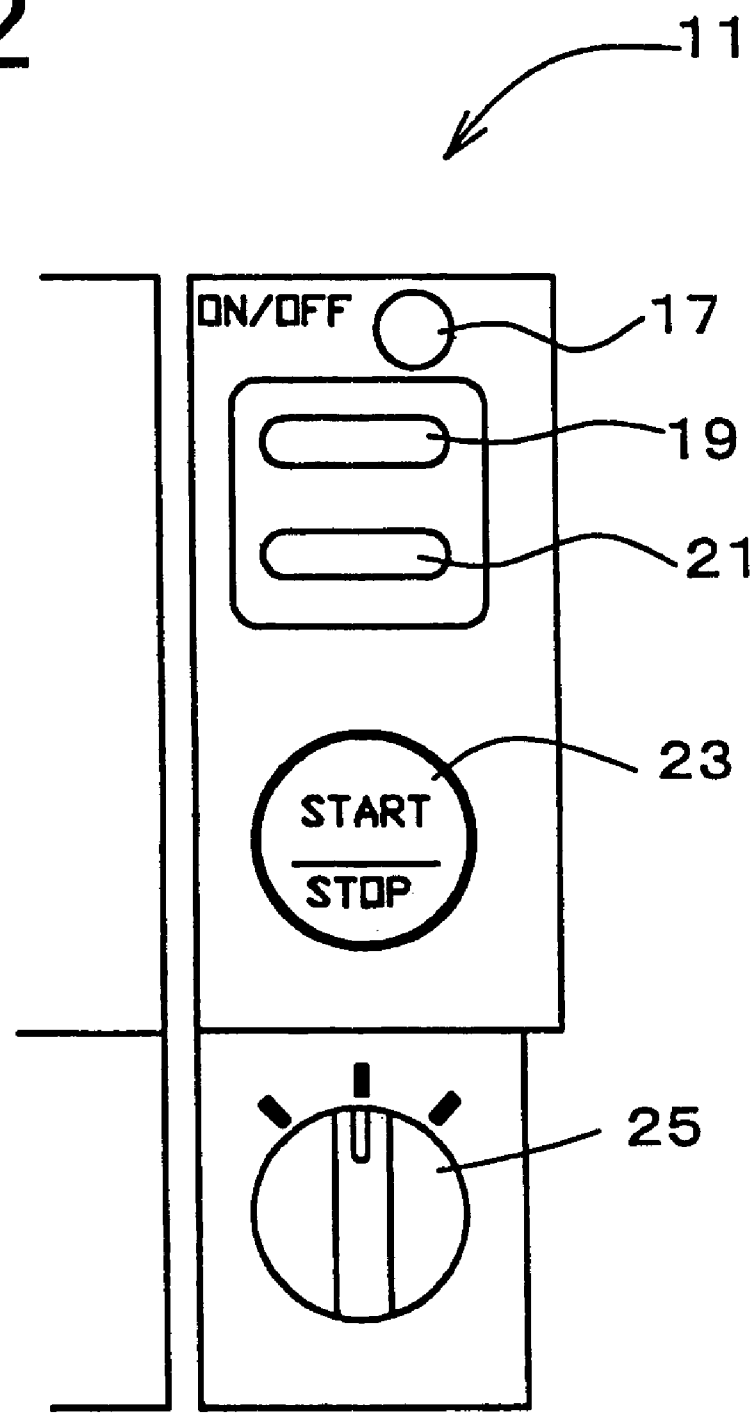
FIG. 2 is a partial top view of a control panel of the apparatus in the first embodiment.
Figure 3:
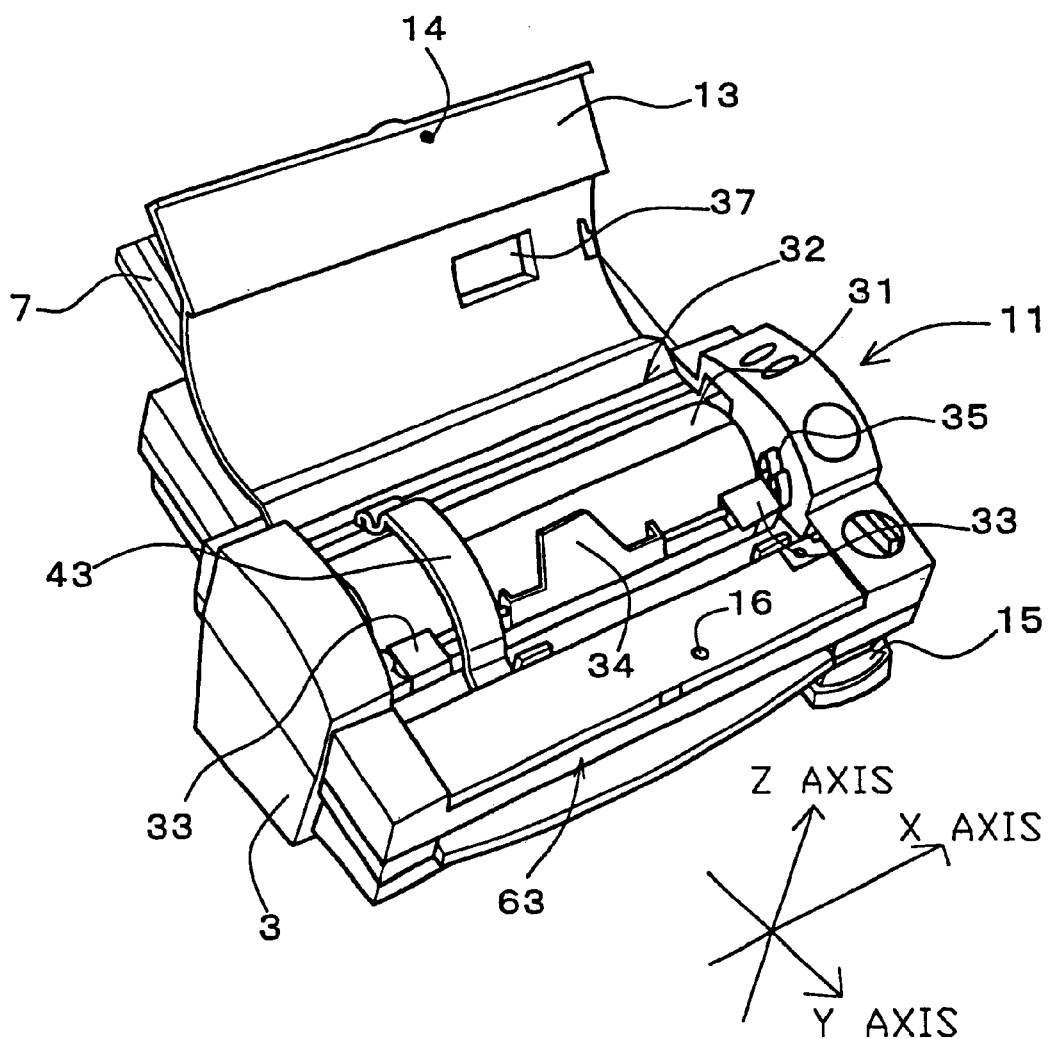
FIG. 3 is a perspective view of the laminating apparatus with a top cover opened.

A schematic structure of the laminating apparatus in a first embodiment will be first described with reference to FIGS. 1 to 4. FIG. 1 is a perspective view of the laminating apparatus. FIG. 2 is a partial top view of a control panel of the apparatus. FIG. 3 is a perspective view of the apparatus with a top cover opened. FIG. 4 is an enlarged top view of a sheet cassette holding part in the apparatus.

Figure 10:
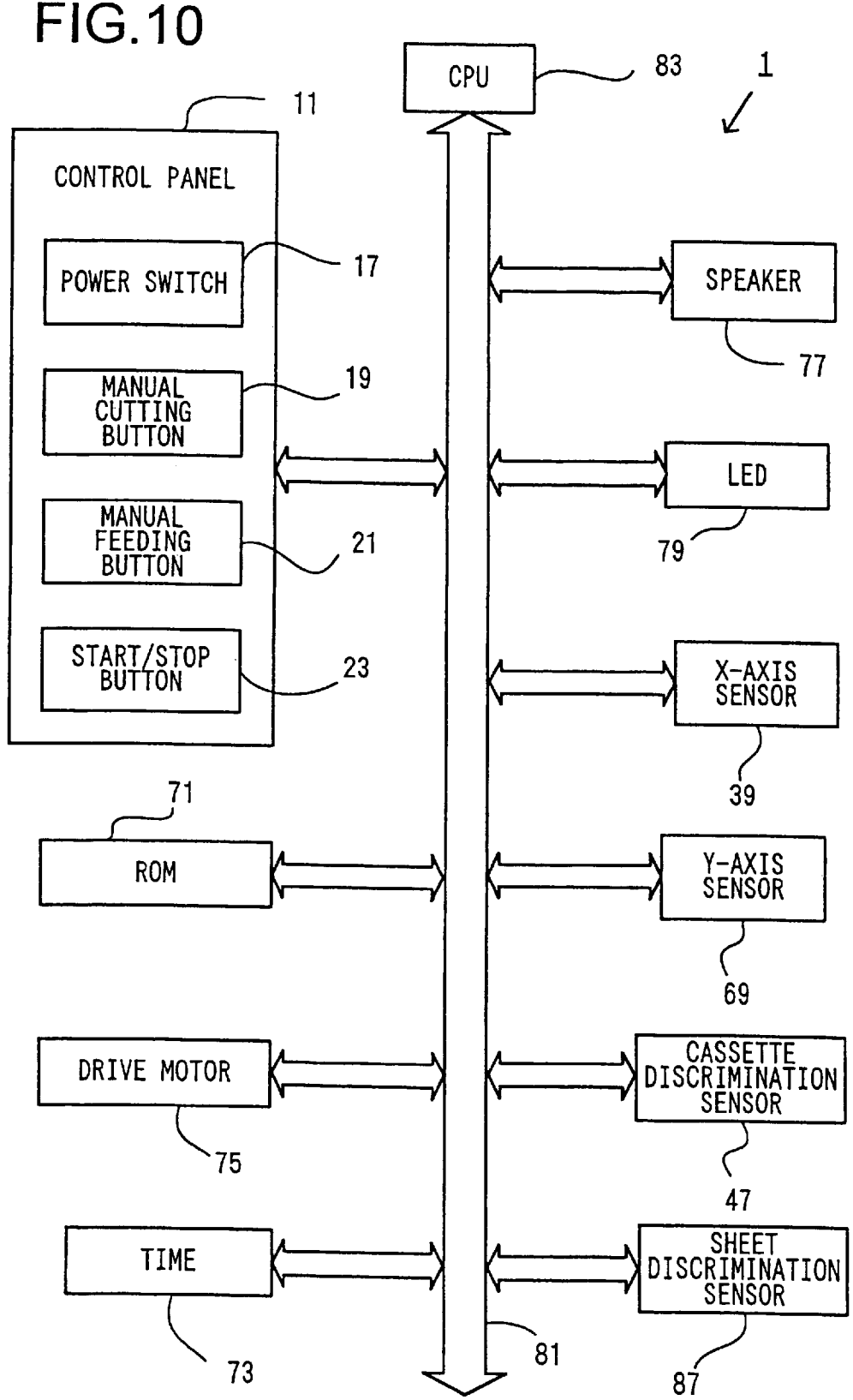
FIG. 10 is a block diagram of a control system of a laminating apparatus in a second embodiment according to the present invention.
Figure 11:
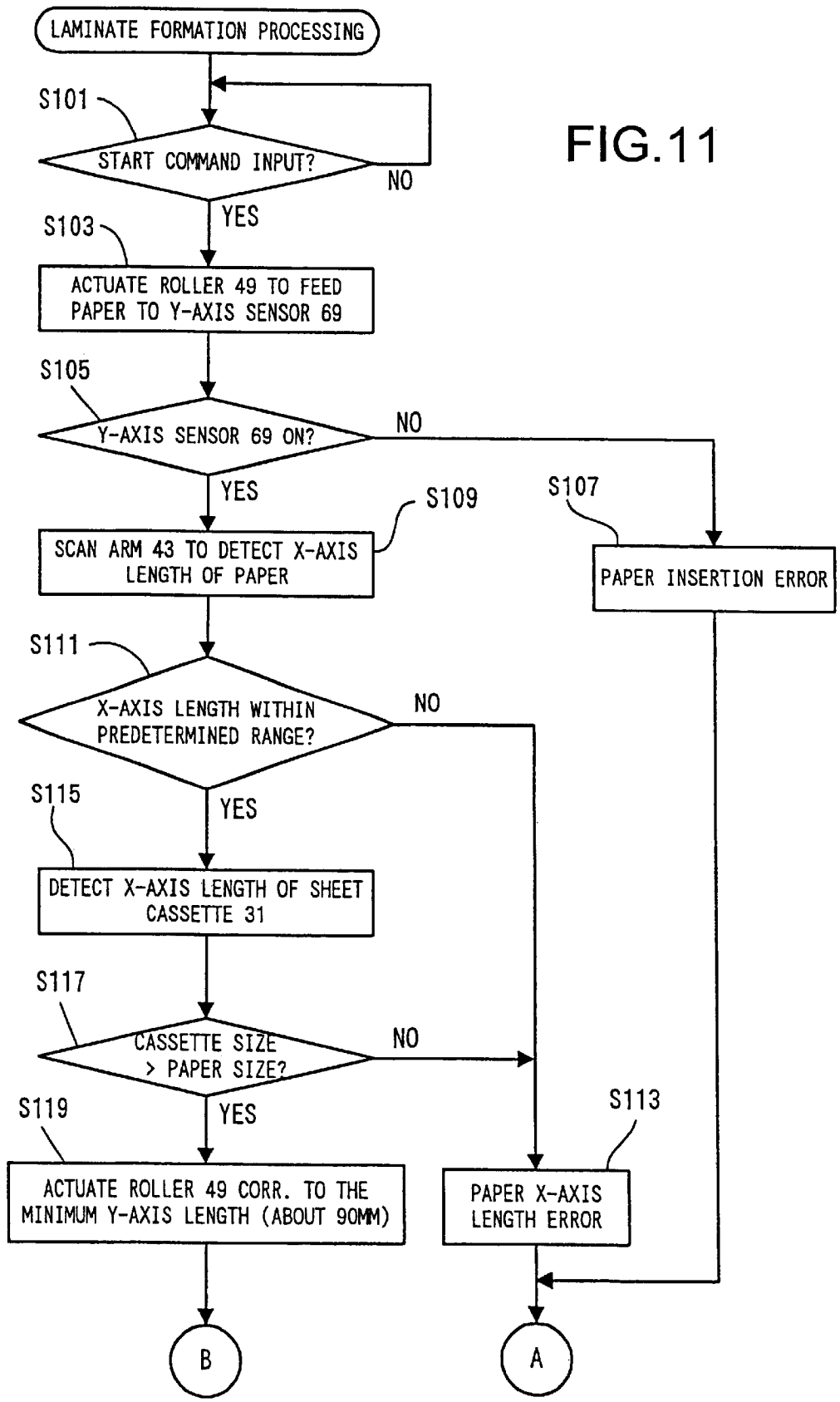
FIG. 11 is a flowchart of steps of producing a laminate in the laminating apparatus in the second embodiment.
Figure 12:
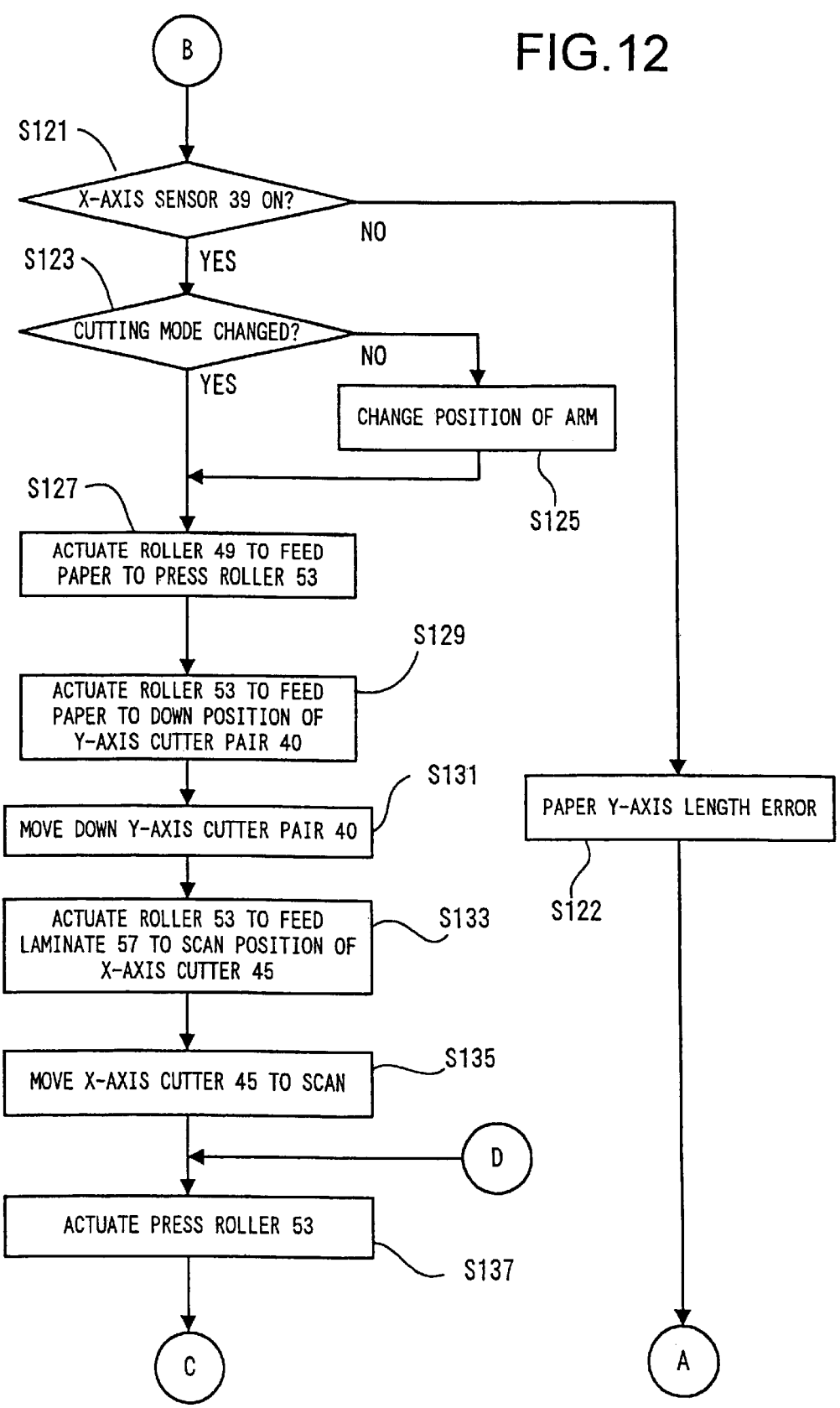
FIG. 12 is a flowchart of steps following those in FIG. 11.
Figure 13:
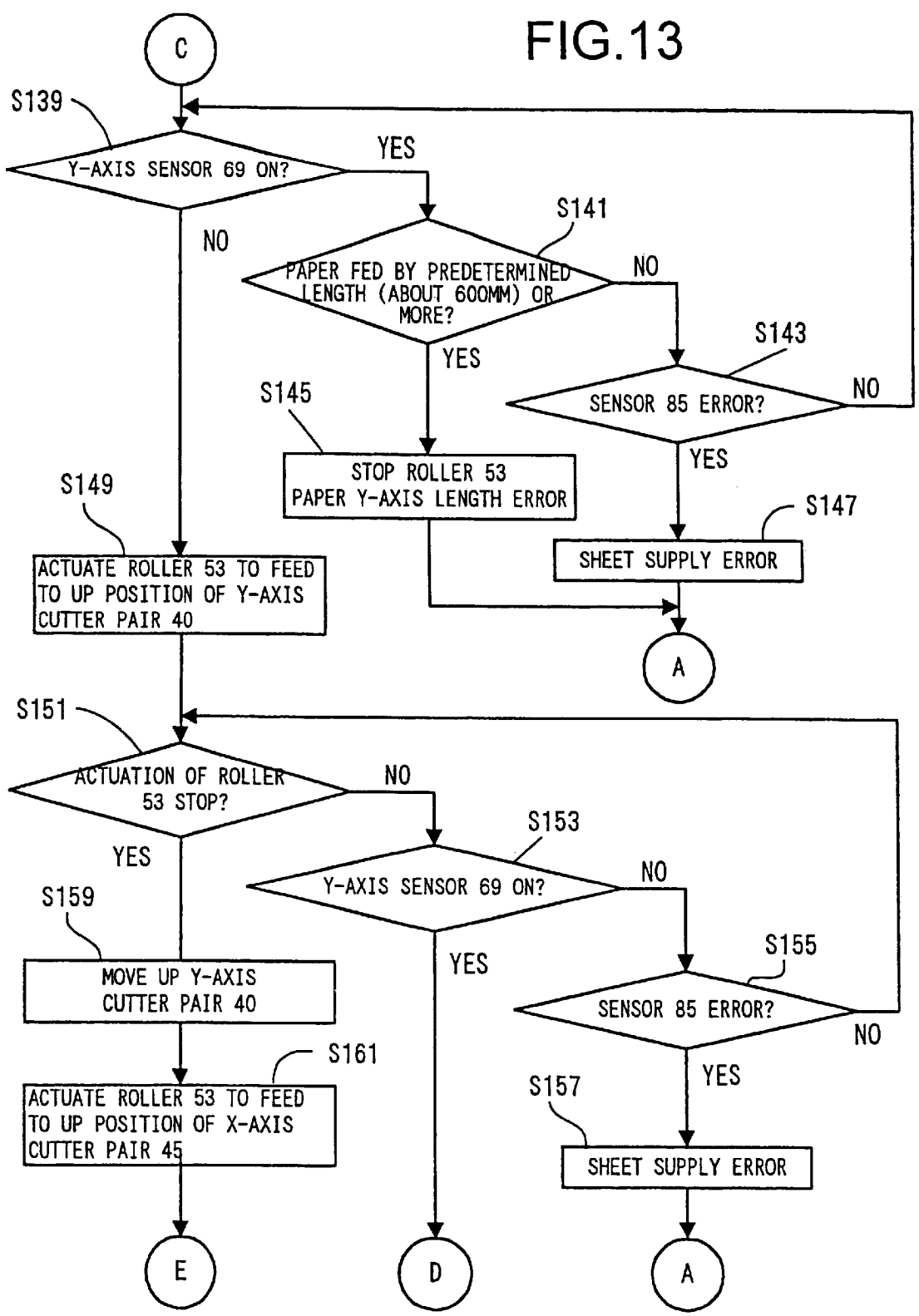
FIG. 13 is a flowchart of steps following those in FIG. 12.
Figure 14:
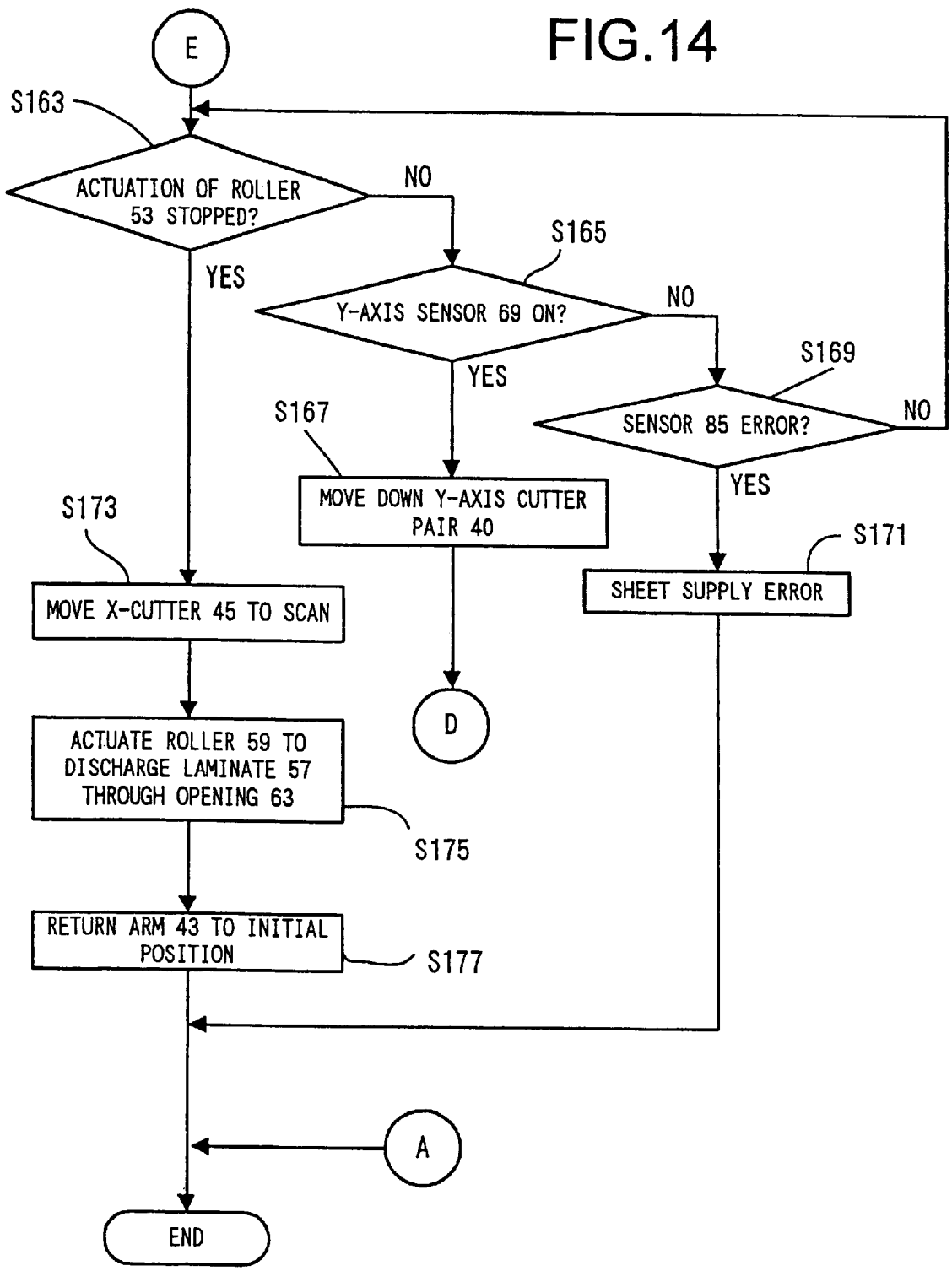
FIG. 14 is a flowchart of steps following those in FIG. 13.

In FIG. 1, a laminating apparatus 1 has a box-like housing 3 provided at the backside thereof (a left side in FIG. 10 with a paper tray 7 on which paper 5 (see FIG. 5) such as documents or cards to be laminated are placed. The paper tray 7 is disposed at a slope. A paper guiding part 8 is integrally provided next to the tray 7. This guiding part 8 includes at both sides a pair of paper guides 9A, 9B for restricting movement of the paper 5 placed on the tray 7 in a direction of the width thereof (which is hereinafter referred to as an X-axis direction).

The paper guide 9A is fixedly formed into one body with the guiding part 8, while the paper guide 9B is movably attached to the guiding part 8. This guis 9B is in engagement with a groove 9C formed in the part 8. The fixed paper guide 9A is used to guide a side edge (a right edge in FIG. 1) of the paper 5. The movable guide 9B is moved along the groove 9C to a position where the guide 9B comes into contact with the other side edge (a left edge in FIG. 1) of the same, thereby to guide the other side edge according to the width of the paper 5. It is to be noted that the paper 5 fed from the paper tray 7 through the paper guiding part 8 and the guides 9A, 9B is transported to a sheet supply area II (see FIG. 5) which will be mentioned later.

In the housing 3, as shown in FIG. 4, a sheet cassette holding part 32 for receiving a sheet cassette (see FIG. 3). A top cover 13 is rotatably attached to the housing 3 to open or close the sheet cassette holding part 32. The cover 13 is provided with a projection 14 on the underside as shown in FIG. 3. The projection 14 is arranged in correspondence with an open/close switch 18 (see FIG. 6) disposed under a switching hole 16 formed in a front side (a lower side in FIG. 3) of the housing 3. When the cover 13 is closed, the projection 14 is inserted into the switching hole 16 to turn the switch 18 to the on state. When the cover 13 is opened as shown in FIG. 3, on the other hand, the projection 14 is removed from the switching hole 16 to turn the switch 18 to the off state. The cover 13 is also provided with a transparent window 37 for allowing a user to visually confirm whether the sheet cassette 31 is mounted in the holding part 32.

A control panel 11 for instructing or selecting various operations of the laminating apparatus 1 is arranged on the top of the housing 3 adjacent to the top cover 13 (in the right side in FIGS. 1 and 3). On the control panel 11, as shown in FIG. 2, there are arranged a power switch 17 used for turning on/off the power of the laminating apparatus 1, a manual cutting bottom 19 for performing a cutting operation on a laminate 57 (see FIG. 5) by sliding an X-axis cutter 45 (see FIG. 4) which will be mentioned later, a manual feeding button 21 for commanding a feed of paper 5, a first sheet 27, a second sheet 29, or a laminate 57, a start-stop button 23, and a cutting mode selection switch 25. Those buttons and/or switches are operated by a user to produce a laminate 57 as desired.

The power switch 17 is used for turning on/off the power of the laminating apparatus 1 under the condition that the apparatus 1 is powered through a plug of a power supply part 85 mentioned later connected with an outlet of a utility power source. It is to be noted that the apparatus 1 is powered from the utility power source through an AC adapter not shown that converts utility power (current) into a direct current (DC).

The manual feed button 21 and the manual cutting button 19 are used for forming a laminate 57 in accordance with operator's purposes irrespective of shapes of paper 5 to be laminated. The buttons 21 and 19 are also used for discharging outward and cutting a part of a laminate 57 if troubles such as a jamming arise in the laminate part between a pair of press rollers 53, 55 during rotation to laminate the paper 5 with the first and second sheets 27 and 29 unreeled from a first and second sheet rolls 65 and 67 each containing long length of rolled continuous sheet.

The start-stop button 23 is used for automatic formation of a laminate 57 according to the shape and size of paper 5 to be laminated (an automatic formation mode).

The cutting mode selection switch 25 is used for selecting a mode from among a margin mode in which a laminate 57 is cut with margins around the laminated paper 5, a non-margin mode in which a laminate 57 is cut to the size of the paper 5 with no margin around the laminated paper 5, and other modes. In those modes, as mentioned later, the X-axis cutter 45 to be slid in a width direction of paper 5 and a Y-axis cutter pair 40 (which includes a first and second Y-axis cutter blades 41 and 42) to be slid in a lengthwise direction of paper 5 are selectively operated.

The housing 3 has a discharge part 63 in the front thereof. Through this discharge part 63, a laminate 57 made of paper 5 laminated between the first and second sheets 27, 29 is discharged to the outside of the apparatus 1. At a corner of the housing 3 (the right corner in FIGS. 1 and 3), the housing 3 is also provided with a part 15 for removing sharp corners of the discharged laminate 57. Specifically, this corner-removing part 15 is used to trim away the sharp corners of the square laminate 57 to have round corners.

Figure 5:
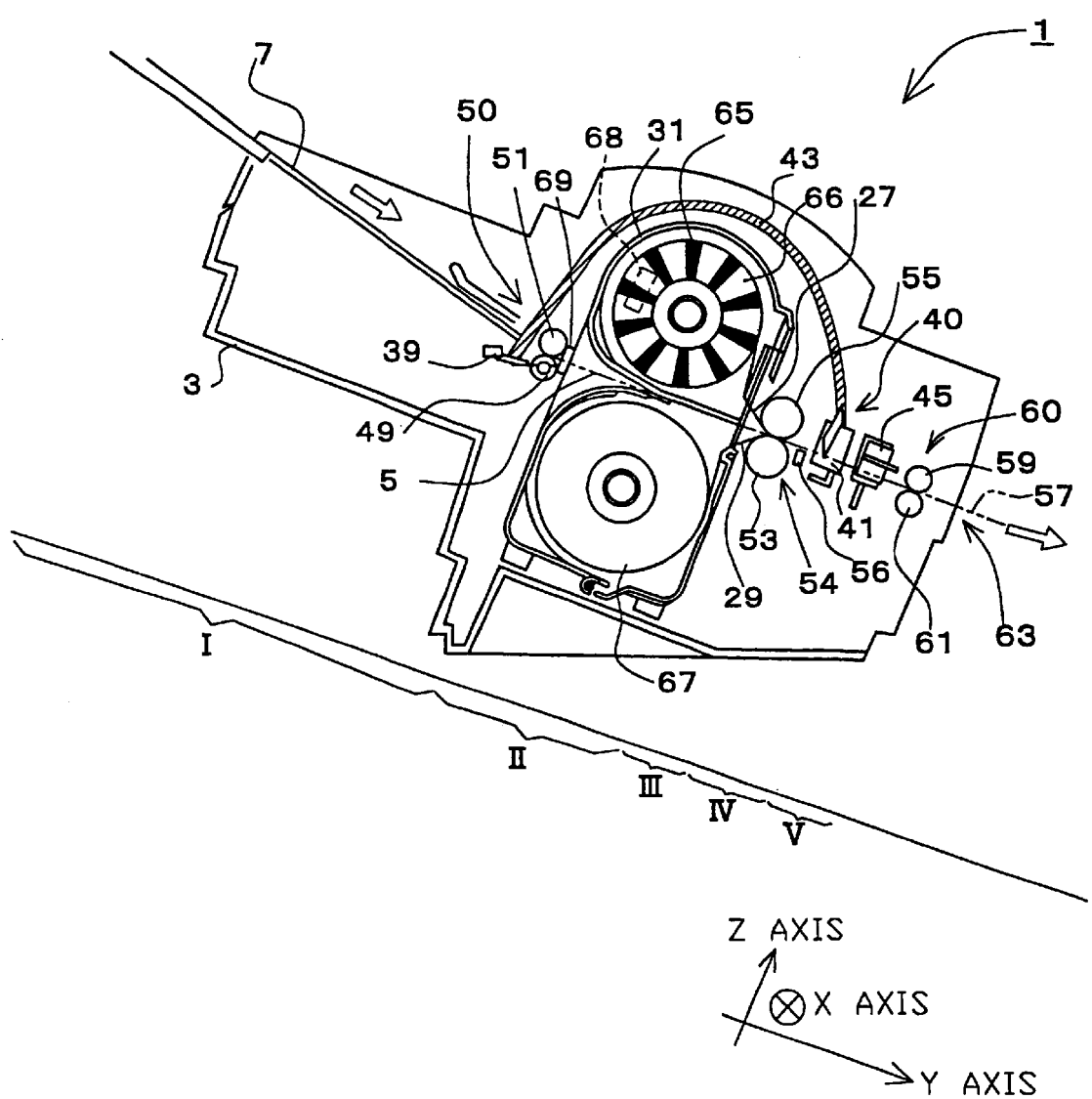
FIG. 5 is a side sectional view of the laminating apparatus.
Figure 6:
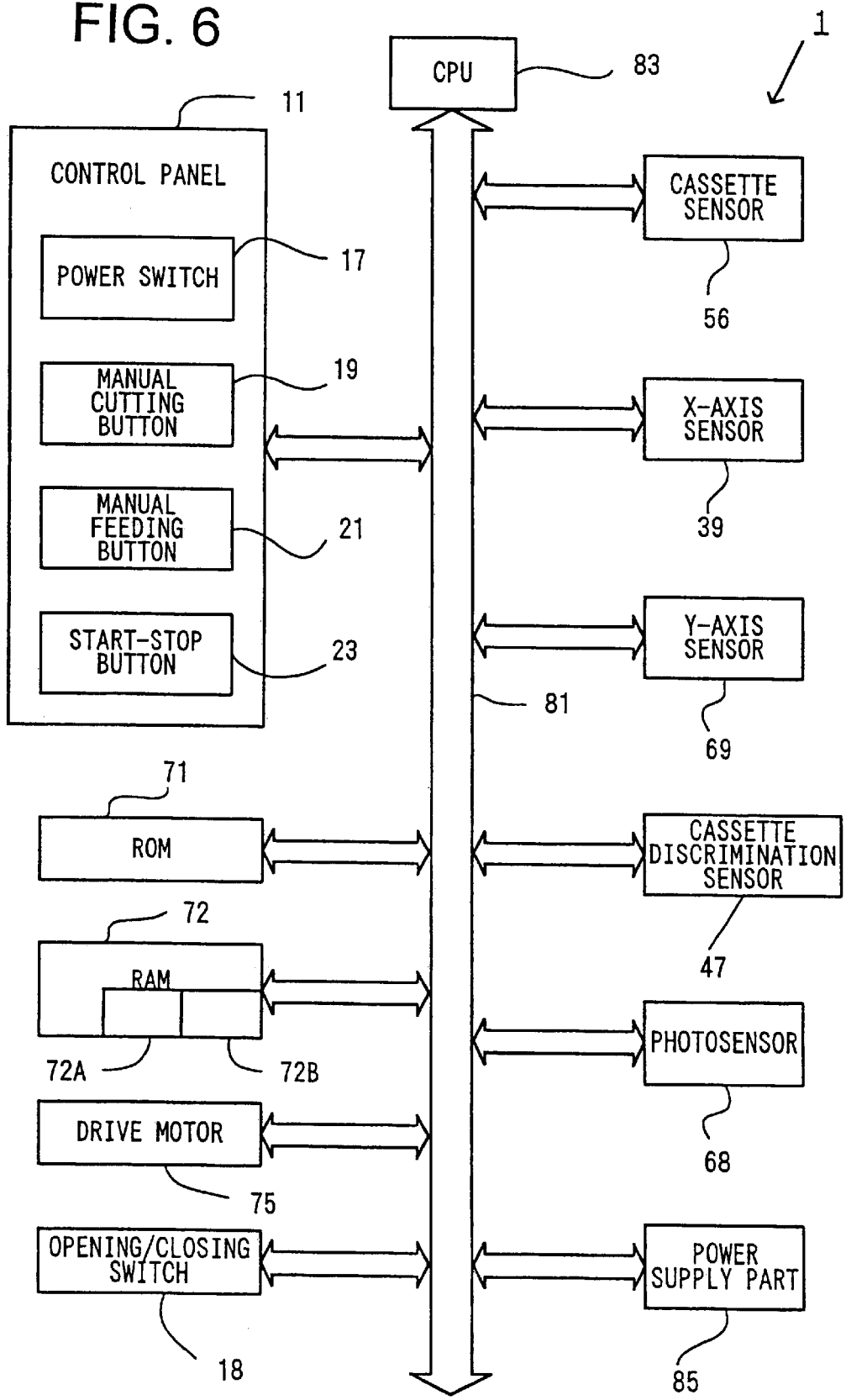
FIG. 6 is a block diagram of a control system of the laminating apparatus in the first embodiment.

Next, the internal arrangement of the laminating apparatus 1 in the first embodiment will be described with reference to FIGS. 3 to 5. FIG. 5 is a side sectional view of the laminating apparatus 1. In FIG. 6, the apparatus 1 includes a paper supply area I, a sheet supply area II, a laminate formation area III, a cutting area IV, and a discharge area V, which are aligned in this order from an upstream side in a paper feeding direction.

In the paper supply area I, the paper 5 placed on the tray 7 is guided by the guides 9A, 9B and fed from the guide part 8 to the sheet supply area II.

In the sheet supply area II, at the most upstream side thereof, there is arranged a paper feed roller pair 50 constructed of a paper feed roller 49 for feeding paper and a driver roller 51. The feed roller 49 is connected to a drive motor 75 (see FIG. 6) through a gear mechanism. When rotated by actuation of the drive motor 75 and the gear mechanism, the feed roller 49 operates in cooperation with the driven roller 51 to feed the paper 5 downstream.

In the downstream from the paper feed roller pair 50, the sheet cassette holding part 32 is provided for receiving the sheet cassette 31 which will be mentioned later. The structure of the sheet cassette holding part 32 is described below, referring to FIG. 4. This part 32 has a concave space in which the cassette 31 is inserted, and a cassette discrimination sensor 47 such as a microswitch and the like is installed on the bottom wall of the part 32. The sensor 47 is to discriminate the types of the sheet cassette 31 (e.g., sizes and lengths in the X-axis direction) inserted in the holding part 32. For example, when the sheet cassette 31 containing sheets of an A4-sized width is inserted, the bottom wall of the cassette 31 contacts and pushes the sensor 47 to switch it to the on state. On the other hand, when the cassette 31 containing sheets of an A6-sized width is inserted, which is so small that the bottom wall does not come into contact with the sensor 47, the sensor 47 remains off. Based on the on/off state of the sensor 47, the size of the cassette 31 inserted in the holding part 32 can be detected.

A sensor 69 for detecting a length of paper 5 in an Y-axis direction (in FIG. 4) is disposed in an upper side of the rear wall of the holding part 32. This Y-axis length sensor (referred to as a Y-axis sensor hereinafter) 69 is switched to the on state by the contact with top end of the paper 5 fed from the paper supply area I. The sensor 69 remains on during feed of the paper 5, and then will be switched to the off state when the bottom end of the paper 5 is transported past the sensor 69. Then, the length of the paper 5 can be determined by calculation of the number of rotations of the drive motor 75 for a period of time from the on to off states of the Y-axis sensor 69 and correlation of the calculated number of rotations of the drive motor 75 with the length of the transported paper 5.

The structure of the sheet cassette 31 is described below with reference to FIG. 5. This cassette 31 holds therein two rotatable sheet rolls; the first sheet roll 65 and the second sheet roll 67, which are vertically aligned. The first roll 65 comprises a first sheet 27 made of polyethylene terephthalate (PET) film with an adhesive applied to one face thereof. The sheet 27 is rolled with the adhesive applied face inside. Similarly, the second roll 67 comprises a second sheet 29 made of PET film with an adhesive applied to one face thereof and rolled with the adhesive applied face inside. The first and second sheets 27, 29 are unreeled from the sheet cassette 31 by rotation of the press roller pair 54 arranged in the laminate formation area III so that the adhesive applied faces of the sheets 27, 29 are face to face with each other, as shown in FIG. 5. The sheets 27, 29 are adhesively laminated on both faces of the paper 5 fed into the cassette 31 by means of the paper feed roller pair 50.

On the end face of the first sheet roll, 65, as shown in FIG. 5, an encoder plate 66 with a predetermined slit pattern is attached. A photosensor 68 is also installed on a side wall of the holding part 32 near the encoder plate 66. This photosensor 68 is to detect the slit pattern of the encoder 66 which is rotated concurrently with rotating of the first roll 65, and thus to generate a detection signal. This detection signal from the photosensor 68 can be used for removal of slack generated in the first and second sheets 27, 29 and for detection of the types of the first and second sheet rolls 65, 67 and the ends of the sheets 27, 29, i.e., the exhaustion of those sheets. It is to be noted that the structures of the encoder plate 66 and the photosensor 68 are substantially the same as disclosed in Japanese patent unexamined publication No. 2000-37775.

As shown in FIG. 3, in the sheet supply area II, a pair of right and left locking members 33 is arranged above the cassette 31 and downstream in the paper feeding direction. A cassette pressing member 34 is provided at about the midpoint between the locking members 33 and operated together with the locking members 33. Each of the locking members 33 is connected to a release lever 35 (only one lever is shown in FIG. 3). The cassette pressing member 34 presses the sheet cassette 31 inserted in the holding part 32, locking the cassette 31 in position. To dismount the cassette 31, for example, for replacement, an arm 43 (mentioned later) is moved to a left end in FIG. 3 and the release levers 35 are operated to release the lock of the locking members 33. Thus, the pressing force of the cassette pressing member 34 exerted on the cassette 31 is released, which permits a user to lift the sheet cassette 31 out of the holding part 32.

The apparatus is configured such that when the pressing force of the pressing member 34 is released, a clearance is produced between a drive roller 53 and a driven roller 55 of the press roller pair 54 which will be mentioned later in detail. In this state, when the cassette 31 is inserted in the holding part 32, the exposed end portions of the first and second sheets 27, 29, which are adhered to each other with an adhesive and extend outside the cassette 31, are slipped into the clearance between the rollers 53, 55. Thereafter, the locking members 33 are depressed while pressing the cassette 31 by the cassette pressing member 34 to lock the cassette 31 in place in the holding part 32.

The structure of the laminate formation area III is described below. In this area III, the press roller pair 54 is arranged. This roller pair 54 comprises the drive roller 54 (a lower roller) and the driven roller 55 (an upper roller), which are vertically aligned. The drive roller 53 is connected to the drive motor 75 through a gear train and the like. The drive roller 53 when rotated by actuation of the motor 75 operates in cooperation with the driven roller 55 to unreel the first and second sheets 27, 29 from the cassette 31 while sandwiching the paper 5 passing through the cassette 31 between the first and second sheets 27, 29 having the adhesive layers, thereby laminating them. As a result of such the laminate formation process, a laminate 57 is produced.

A cassette sensor 56 is arranged downstream from the press roller pair 54 in the Y-axis direction. This sensor 56 detects the presence or absence of the cassette 31 in the holding part 32 by detecting the presence or absence of the tip ends of the first and second sheets 27, 29 held between the press roller pair 54 when the cassette 31 is mounted in the holding part 32 as mentioned above. A detection signal generated by the cassette sensor 56 is used for a determination in an interrupt processing (see FIG. 7) to detect whether mounting and dismounting of the cassette 31 was made.

The structure of the cutting area IV is described below. In this area IV, there are basically provided an X-axis cutter 45 for cutting the laminate 57 formed in the above manner in a width direction (X-axis direction) and a Y-axis cutter pair 40 for cutting the laminate 57 in a lengthwise direction (Y-axis direction). The X-axis cutter 45 is described first. This cutter 45 is constructed of a circular rotary blade mounted in a carriage movable on a frame attached to the apparatus 1 in a width direction thereof and a fixed blade mounted on the frame in correspondence with the rotary blade. When the carriage is moved on the frame in the width direction by means of a motor and a spiral mechanism not shown, the rotary blade and the fixed blade operate to cut the laminate 57 in the width directing. It is to be noted that such the structure of the X-axis cutter 45 is substantially the same as in Japanese patent unexamined publications Nos. 11-245299, 11-245296, and 11-245297. The detailed description thereof is referred to the applications and omitted in this specification.

The Y-axis cutter pair 40 comprises the first and second Y-axis cutter blades 41, 42. The first Y-axis cutter blade 41 is fixed to an end of the arm 43 (corresponding to the downstream end of the press roller pair 54) upward bent over the cassette 31 mounted in the holding part 32. The blade 41 is movable in the width direction (X-axis direction) of the apparatus 1. The second Y-axis cutter blade 42 is aligned with the first blade 41 in the X-axis direction.

The arm 43 to which the first Y-axis cutter blade 41 is attached is movable in the X-axis direction by activation of a motor. An X-axis length sensor (referred to an X-axis sensor hereinafter) 39 is attached to the other end of the arm 43 (corresponding to the upstream end of the feed roller pair 50) for detecting the width of the paper 5 in the X-axis direction. The arm 43 is normally placed in a left position (home position) as shown in FIG. 4. To detect the width of the paper 5 by the use of the X-axis sensor 39, the following process is performed. When the Y-axis sensor 69 detects the presence of the top end of the paper 5, the arm 43 is moved form the home position in the X-axis direction until the sensor 39 detects the presence of the left edge (in FIGS. 1 and 4) of the paper 5. At this time, the right edge of the paper 5 is in contact with the guide 9A. Also, a first distance between the guide 9A and the home position of the arm 43 is determined in advance. A second distance between the home position and the left edge of the paper 5 is calculated based on the number of rotations of the motor required to move the arm 43 until the sensor 39 detects the left edge of the paper 5. This second distance is subtracted from the first distance and the width of the paper 5 is obtained.

When the margin mode is selected by manipulation of the cutting mode selection switch 25 on the control panel 11, the arm 43 is moved to a position where the X-axis sensor 39 detects the left edge of the paper 5. With an operating mechanism operated in synchronization with manipulation of the cutting mode selection switch 25, the first and second Y-axis cutters 41, 42 are set to respective positions separate from each other so that the laminate 57 is cut with margins on both sides of the laminated paper 5. When the non-margin mode is selected with the switch 25, on the other hand, the first and second Y-axis cutters 41, 42 are set by means of the operating mechanism to respective positions closer to each other than in the margin mode.

The first and second Y-axis cutters 41, 42 are movable in a vertical, namely, Z-axis direction by means of a motor, a cam mechanism, and the like. With the cutters 41, 42 positioned down, when the laminate 57 is fed in a Y-axis direction by the rotation of the press roller pair 54, the side margins of the laminate 57 (both sides of the paper 5) are cut out along the side edge in the Y-axis direction. This Y-axis cutter pair 40, like the case of the X-axis cutter 45, is substantially the same as in Japanese patent unexamined publications Nos. 11-245299, 11-245296, and 11-245297. The detailed description thereof is referred to the applications and omitted in this specification.

The laminate discharging area V is explained below. In this area V, a discharge roller pair 60 constructed of a discharge roller 59 and a driven roller 61. The discharge roller 59 is rotated by actuation of the drive motor 75 to discharge in cooperation with the driven roller 61 the finished laminate 57 that has been cut to a desired size by the X-axis cutter pair 45 and the Y-axis cutter pair 40 to the outside of the laminating apparatus 1 through a discharge opening of the discharge part 63.

Next, the control system of the laminating apparatus 1 in the first embodiment will be described with reference to FIG. 6. FIG. 6 is a block diagram of the control system.

The control system in the present embodiment is configured such that a CPU 83 is arranged as a core. Connected to the CPU 83 through a bus line 81 are the control panel 11, a ROM 71, a RAM 72, the drive motor 75, the open/close switch 18, the cassette sensor 56, the X-axis sensor 39, the Y-axis sensor 69, the cassette discrimination sensor 47, the photosensor 68, and the power supply part 85. This power supply part 85 is provided with a plug connectable with an outlet of a utility power source and used for supplying a direct current (DC) to the apparatus 1 through an AC adapter that converts utility power (current) into a direct current.

The power switch 17 on the control panel 11 is used for powering on/off the laminating apparatus 1 under condition that power is supplied to the apparatus 1 through the plug connected with the outlet of the utility power source. Upon press of the manual cutting button 19, the CPU 83 causes the X-axis cutter 45 to cut the laminate 57. Upon press of the manual feeding button 21, the CPU 83 causes the press roller pair 54 and the discharge roller pair 60 to feed the laminate 57. Upon press of the start-stop button 23, the CPU 83 causes the press roller pair 54 to start or stop a laminating operation.

The ROM 71 stores a monitoring program mentioned later for monitoring an opened/closed state of the top cover 13 according to an on/off signal of the open/close switch 18, a slack removable processing program mentioned later for removing slack generated in the first and second sheets 27, 29, and other various programs required for control of the laminating apparatus 1. The CPU 83 operates to perform various processing operations in accordance with the programs stored in the ROM 71.

The RAM 72 is the memory for temporarily storing various data calculated in the ROM 71. In the RAM 72, there are provided a cassette replacement flag 72A that will be set to an on state at an interrupt processing for performing the processing to monitor the opened/closed state of the top cover 13, and a cold flag 72B that will be set to an on state at a cold start at which the power supply part 85 starts power supply to the laminating apparatus 1.

The drive motor 75 is used for rotating the feed roller pair 50, the press roller pair 54, and the discharge roller pair 60. The CPU 83 controls each rotation of those roller pairs as required.

The photosensor 68 detects a slit pattern formed on the encoder plate 66 attached to the end face of the first sheet roll 65. Based on the detection result, the photosensor 68 outputs a predetermined rectangular pulse to the CPU 83. Upon receipt of the rectangular pulse, the CPU 83 monitors the amount of slack to be removed from the first and second sheets 27, 29 in the slack removal processing.

The cassette discrimination sensor 47 is switched to the on or off state according to the size of the sheet cassette 31 inserted in the holding part 32. The CPU 83 then detects the size of the cassette 31 according to the on/off signal from the sensor 47.

The photosensor 56 detects the presence of the tip ends of the first and second sheets 27, 29 held between the press roller pair 54 when the cassette 31 is mounted in the holding part 32. Based on the detection signal from the cassette sensor 56, the CPU 83 monitors whether or not the cassette 31 is dismounted from and mounted in the holding part 32.

The X-axis sensor 39 detects the side edge (the left edge in FIG. 4) of the paper 5 when the arm 43 is moved from the home position. Based on the number of rotations of the motor required to move the arm 43, the CPU 83 calculates a distance between the home position and the side edge of the paper 5 (i.e., the second distance), and then subtracts the calculated distance from a distance between the home position and the other side edge of the paper 5 (which is in contact with the guide 9A) (i.e., the first distance), thereby to calculate the width of the paper 5. The Y-axis sensor 69 detects the top and bottom ends of the paper 5. The CPU 83 determines the length of the paper 5 according to the on/off signal from the sensor 69.

Figure 7:
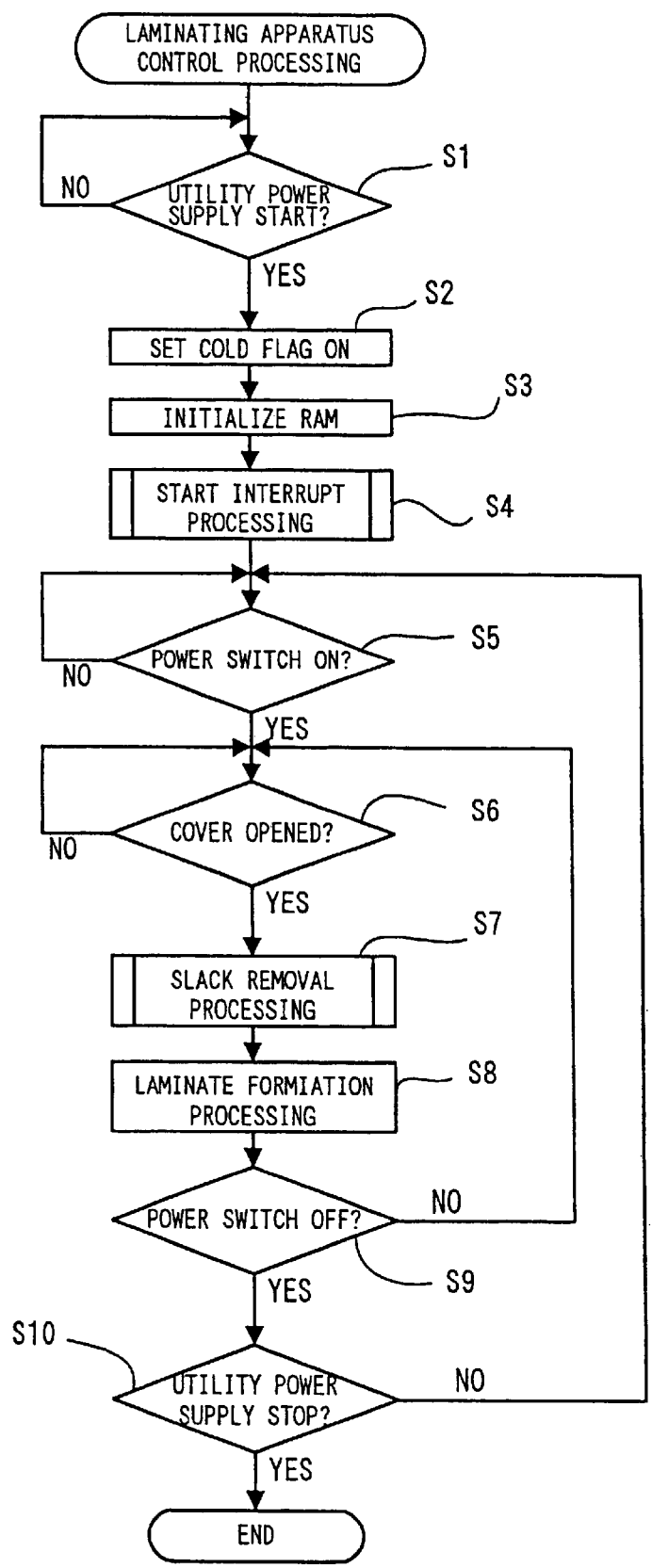
FIG. 7 is a flowchart of a lamination processing control program in the laminating apparatus.
Figure 8:
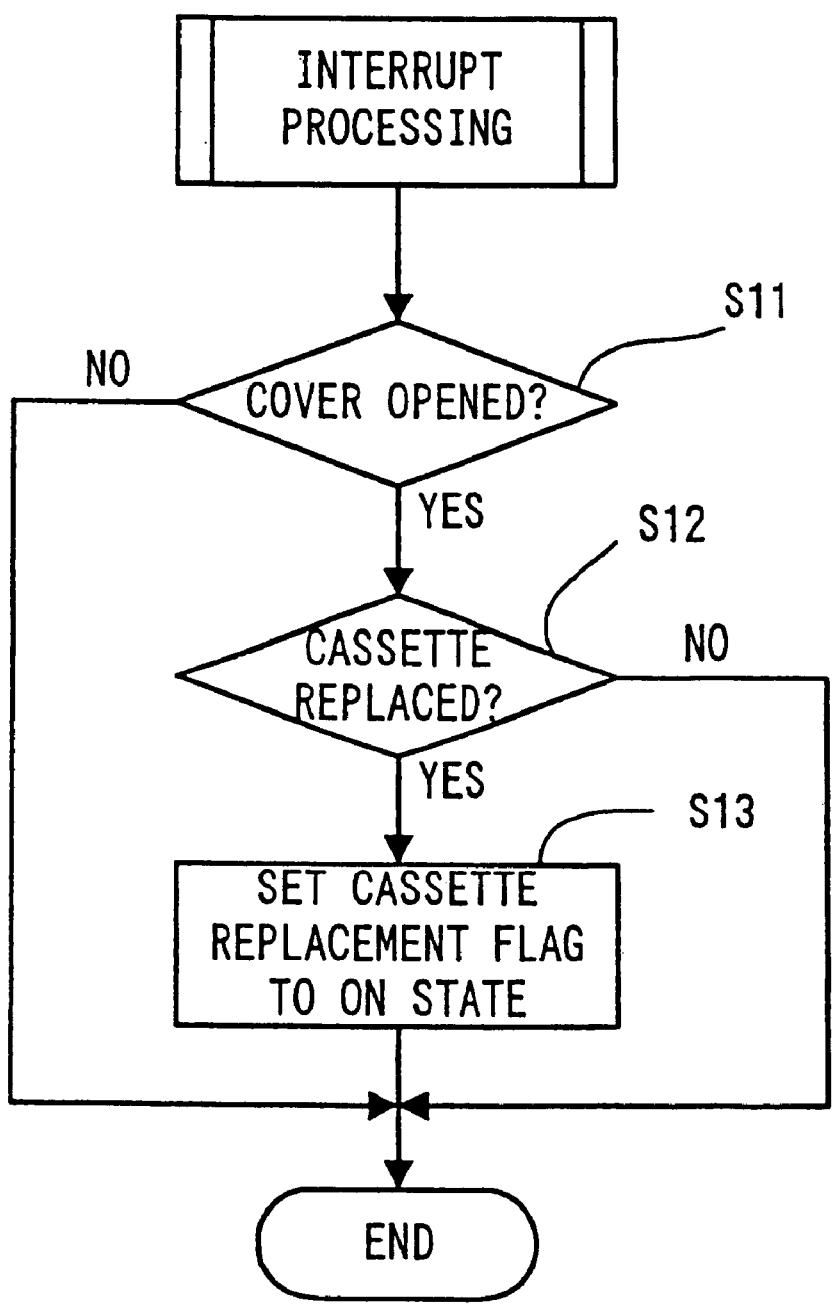
FIG. 8 is a flowchart of an interrupt processing program.
Figure 9:
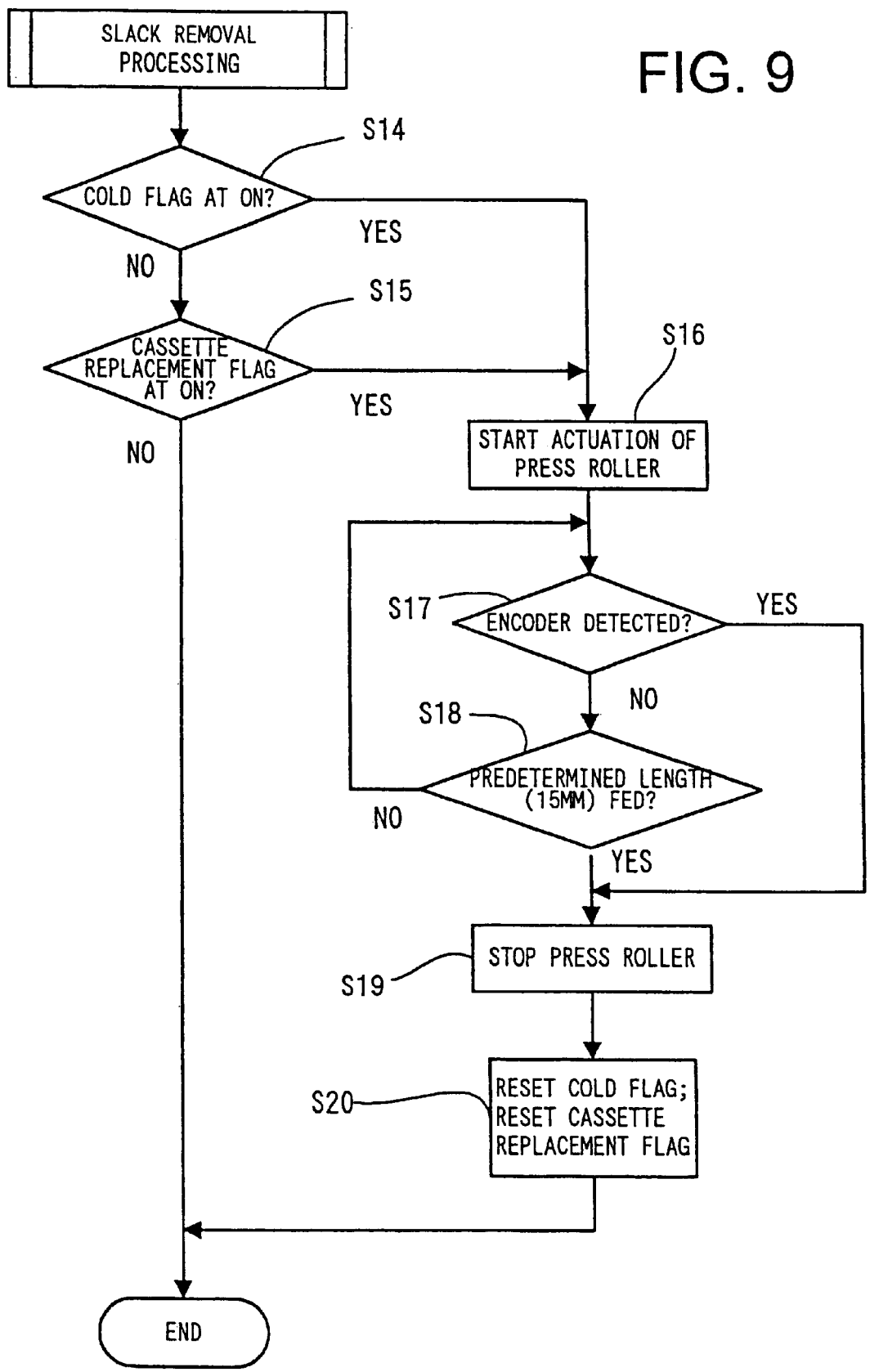
FIG. 9 is a flowchart of a slack removal processing program.

Control processing to be executed in the laminating apparatus 1 constructed as above will be described with reference to FIGS. 7–9. FIG. 7 is a flowchart of a control processing program of the laminating apparatus 1. FIG. 8 is a flowchart of an interrupt processing program. FIG. 9 is a flowchart of a slack removal processing program.

In the flowchart of FIG. 7, upon start of power supply from the utility power source to the apparatus 1 (S1: YES), the flow advances to step S2. This judgement in S1 is executed depending on whether or not the plug of the power supply part 85 is connected with the outlet of the utility power source. If the plug is not connected with the outlet (S1: NO), the CPU is set in a standby state until the plug is connected with the outlet. If power supply from the utility power source to the apparatus 1 is started (S1: YES), the cold flag 72B is set to the on state in S2. Then, the RAM 72 is initialized (S3) and the interrupt processing is started (S4) in sequence.

The interrupt processing in S4 is explained below with reference to FIG. 8. This interrupt processing is executed for determining whether or not the sheet cassette 31 is dismounted from and mounted in the holding part 32 during power supply from the utility power source. In FIG. 8, in S11, the first check is made as to whether or not the top cover 13 is opened. This is determined according to whether the open/close switch 18 is turned to the off state by the projection 14 removed from the switch hole 16 when the top cover 13 is opened. If the top cover 13 is not opened, namely, the switch 18 remains on (S11: NO), it is determined that the sheet cassette 31 was not dismounted and mounted. The interrupt processing is then terminated.

If it is determined according to the off state of the switch 18 that the top cover 13 is opened (S11: YES), then the determination is made in S12 as to whether the cassette sensor 56 is switched to the on state from the off state. If the sensor 56 is switched on from off (S12: YES), this indicates that the cassette 31 was dismounted from and mounted in the holding part 32, the cassette replacement flag 72A is set to the on state in S13 and the interrupt processing is terminated. If the sensor 56 is not switched on from off (S12: NO), on the other hand, this indicates that the cassette 31 was dismounted from and mounted in the holding part 32 even though the cover 13 was opened, the flag 72A is not set to the on state and the interrupt processing ends.

In the interrupt processing, as mentioned above, the cassette replacement flag 72A is set to the on state when the sensor 56 detects the dismounting and mounting of the cassette 31 with respect to the holding part 32.

Returning to FIG. 7, after completion of the interrupt processing in S4, the determination is made in S5 as to whether the power switch 17 is pressed to turn on the power. If the power is not turned on by the switch 17 (S5: NO), the CPU is set in a standby state until the switch 17 is pressed. On the other hand, if the power switch 17 is pressed and thus the power is turned on (S5: YES), it is subsequently determined in S6 whether the top cover 13 is closed. This determination in S5 is made according to whether the open/close switch 18 is turned to the on state by the projection 14 of the cover 13 through the switch hole 16. If the cover 13 is not closed (S6: NO), the CPU 83 is set in a standby state until the cover 13 is closed.

If the cover 13 is closed (S6: YES), the slack removal processing is executed in S7. This slack removal processing is described below with reference to FIG. 9

In this processing, a first determination is made in S14 whether or not the cold flag 72B has been set to the on state, namely, whether or not the power-on (S5: YES) is the first power-on since the start of the power supply to the apparatus 1 from power supply part 85. If the cold flag 72B has not been set to the on state (S14: NO), the determination is made in S15 as to whether the cassette replacement flag 72A has been set to the on state in S13, namely, whether dismounting and mounting of the cassette 31 with respect to the holding part 32 was conducted.

If it is detected that neither of the cold flag 72B and the cassette replacement flag 72A has been set to the on state (S14:NO, S15:NO), the slack removal processing ends. In this case, the first and second sheets 27 and 29 are not subjected to the slack removal operation.

On the other hand, if at least one of those flags 72B and 72A has been set to the on state (S14:YES or S15: YES), the slack removal processing is executed. This processing is carried out in S16 to S19.

Specifically, in S16, the press roller pair 54 is actuated first to unreel the first and second sheets 27 and 29 from the sheet cassette 31. When the feed of the sheets 27 and 29 is started, the CPU 83 monitors whether the photosensor 68 outputs a rectangular pulse based on detection of the slit pattern of the encoder 66 in rotating as rotation of the first sheet roll 65. When the photosensor 68 detects the predetermined number of rectangular pulses, for example, one pulse, by an encoder detection (S17:YES), it is determined that the slack generated in the first and second sheets 27 and 29 has been removed. The flow is then advanced to S19. On the other hand, when the photosensor 68 does not detect any rectangular pulse (S17:NO), a determination is made as to whether or not the first and second sheets 27 and 29 is unreeled and fed by a predetermined length (15 mm in the present embodiment). When the predetermined length of the sheets 27 and 29 is not fed (S18:NO), the flow returns to S17 where the photosensor 68 detects a rectangular pulse. It is to be noted that the feeding length of the sheets 27 and 29 is not limited to 15 mm, and it may be freely determined.

When the rectangular pulse is detected by the photosensor 68 (S17:YES) or the feeding of the predetermined length of the sheets 27 and 29 is detected (S18:YES), it is determined that the slack in the sheets 27 and 29 has been removed. Then, the press roller pair 54 is stopped in S19. In the following step S20, both the cold flag 72B and the cassette replacement flag 72A are reset to the off state, and the slack removal processing ends.

After the slack removal processing to the sheets 27 and 29 is executed in S7 as mentioned above, the press roller pair 54 is actuated in response to a command input from the control panel 11 in S8, thereby starting a laminate formation processing for sandwiching the paper 5 between the first and second sheets 27 and 29 to laminate them. In S9, a determination is made as to whether the power switch 17 is pressed to turn off the power. If it is turned off (S9:YES), the flow advances to the following step S10. If not (S9:NO), the flow returns to S6. In S10, it is determined whether or not power supply from the utility power source through the power supply part 85 is stopped. This determination is made according to whether the plug of the power supply part 85 is disconnected from the outlet of the utility power source. When the power supply is stopped (S10:YES), the lamination processing control ends. When the power supply is maintained (S10:NO), the flow returns to S5.

The above-mentioned laminating apparatus 1 in the first embodiment is arranged such that the cold flag 72B is set to the on state (S2) upon start of the power supply from the utility power source through the power supply part 85 (S1:YES); the cassette replacement flag 72A is set to the on state (S13) when the cover 13 is opened and thus the cassette sensor 56 is switched on from off (S11:YES); and the slack removal processing to the first and second sheets 27 and 29 is executed (S7, S16–S19) only if the flag 72B or 72A is in the on state (S14:YES, S15:YES) at the time of power-on of the apparatus by the use of the power switch 17 (S5:YES). Comparing the case where a slack removal operation is carried out every power-on of the apparatus by the power switch 17, the slack removal operation is made on the minimum area required to remove slack from the sheets 27 and 29. This can minimize wasteful consumption of the sheets and aesthetically laminate the paper 5 without causing the occurrence of wrinkles in the paper 5 or the sheets 27 and 29.

The laminating apparatus 1 in the first embodiment is also arranged such that the encoder plate 66 having a predetermined slit pattern is attached to the end face of the first sheet roll 65. The photosensor 68 detects the slit pattern of the encoder plate 66 during rotation of the first sheet roll 65. In the slack removing operation, after the start of feed of the sheets 27 and 29 from the cassette 31 by means of the press roller pair 54 (S16), when the CPU 83, monitoring as to whether a rectangular pulse is output from the photosensor 68 in association with the rotation of the first sheet roll 65, detects the output of the predetermined number of rectangular pulses (for example, one pulse) from the photosensor 68 (S17:YES), determining that the slack in the sheets 27 and 29 has been removed, the CPU 83 terminates the slack removal operation (S19). The consumption of the sheets 27 and 29 can be extremely reduced as compared with the case where the sheets 27 and 29 are unreeled and fed by a fixed length every power-on of the apparatus by the power switch 17. This can achieve large reduction in manufacturing cost of the laminate 57.

Furthermore, the laminating apparatus 1 in the first embodiment is arranged such that, after the slack removing operation to the first and second sheets 27 and 29 is performed upon press of the power switch 17 during power supply to the apparatus 1 from the utility power source through the power supply part 85 (S1–S7, S14–S19), the cold flag 72B and the cassette replacement flag 72A are reset to an off state (S20). Under power supply, even when the switch 17 is pressed to turn off the power (S9, S10:NO) and subsequently pressed again to turn on the power (S5:YES), the flags 72B and 72A being kept in the off state (S14:NO, S15:NO), the slack removing operation to the first and second sheets 27 and 29 is not conducted. This can avoid any problem that would be caused by a slack removing operation conducted every power-on of the apparatus by the power switch 17 and thus can prevent wasteful consumption of the sheets.

The present invention may be embodied in other specific forms without departing from the spirit or essential characteristics thereof. For instance, although the first and second sheets 27 and 29 of the first and second sheet rolls 65 and 67 accommodated in the sheet cassette 31 in the above embodiment are applied with an adhesive, both of the sheets do not necessarily need the application of adhesive. That is, it is sufficient only that at least one of the sheets is applied with an adhesive.

In the above embodiment, the encoder plate 66 is attached to the end face of the first sheet roll 65, but it may be attached to the end face of the second sheet roll 67. In this case, the photosensor 68 is disposed in the second sheet roll 67 side.

A second embodiment of the laminating apparatus according to the present invention will be described below. It is to be noted that the structure of the apparatus in the second embodiment has substantially the same as that in the first embodiment. Like elements corresponding to those in the first embodiment are indicate by like numerals and the detail thereof is therefore omitted.

A sheet cassette 31 in the second embodiment includes a plurality of types adapted for a first and second sheets 27 and 29 with different lengths in an X-axis direction. A user can select a sheet cassette 31 corresponding to the X-axis length of paper 5 to be laminated. A transparent window 37 arranged near the center of a cover 13 allows the user to easily confirm the type of the cassette 31 from a label and the like not shown attached to the cassette 31 which shows the X-axis lengths of the first and second sheets 27 and 29, even when the cover 13 is closed (see FIG. 1).

The laminating apparatus 1 in the second embodiment also has five areas I–V via which paper 5 is laminated into a desired laminate 57.

In the paper supply area I, there are provided an X-axis sensor 39 and a Y-axis sensor 69. The X-axis sensor 39 is placed upstream in an Y-axis direction from a paper feed roller 49 and a driven roller 50. The sensor 39 is used for determining the X-axis length of paper 5 by detecting the presence of the paper 5 while an arm 43 scans in the X-axis direction. The Y-axis sensor 69 is placed upstream in an Y-axis direction from a paper supply roller pair 50. The sensor 60 is used for determining the Y-axis length of the paper 5 by detecting the presence of the paper 5. Thus, these X- and Y-axis sensors 39 and 69 enables precise determination of the X-axis and Y-axis lengths of the paper 5 supplied to the area I.

The sheet cassette 31 constructing a sheet supply area II rotatably holds therein a first and second sheet rolls 65 and 67. These rolls 65 and 67 comprise the first and second sheets 27 and 29 respectively. Each of the sheets is made of belt-like long length of a synthetic resin film such as a polyethylene terephthalate (PET) film applied with an adhesive on one face thereof and is rolled with the adhesive face inside. The sheets 27 and 29 are arranged such that the adhesive faces come into contact with the paper 5 to be laminated. It is to be noted that the adhesive may be applied to only one of the first and second sheets 27 and 29, instead of both sheets. Also, instead of the structure made of a synthetic resin film such a polyethylene terephthalate and the like, the sheets 27 and 29 may be constructed as follows: one of the sheets 27 and 29 is made of a magnetic film for enabling attachment of a laminate 57 to a metal plate; or one of the sheets 27 and 29 is applied with an adhesive on both faces thereof and a relesable sheet provided on the face that will be an outer face of a laminate 57, which enables adhesive attachment of the laminate 57 to a desired object.

The first sheet roll 65 accommodated in the sheet cassette 31 is provided, on the side face, with a slit pattern with black and white lines radially extended about an axial center of the roll 65. A sheet discrimination sensor 87 (see FIG. 10) disposed near the first sheet roll 65 detects the slit pattern, which enables recognition of the rotational condition of the first sheet roll 65 or discrimination of the type and the like of the sheet cassette 31 (see Japanese patent unexamined publication No. 2000-37775).

Instead of the provision of the slit pattern to the end face of the first sheet roll 65, the slit pattern may be provided to the end face of the second sheet roll 67. In this case, the sheet discrimination sensor 87 should be arranged near the roll 67 to determine the rotational condition of the first sheet roll 65 or discriminate the types and the like of the sheet cassette 31. Alternatively, a marking whereby a feeding condition of the first sheet 27 and/or the second sheet 29 may be applied to both ends of the first sheet 27 and/or the second sheet 29 in the X-axis direction. In this case, the apparatus should be arranged to determine the rotational condition of the first sheet roll 65 and/or the second sheet roll 67 based on detection results on the marking(s) (see Japanese patent unexamined publication No. 11-348119).

A Y-axis cutter pair 40 provided in a laminate cutting area IV is movable by means of a driving mechanism not shown in a vertical direction (which is perpendicular to the X-axis and Y-axis directions, and is referred to as a Z-axis direction hereinafter). With this cutter pair 40, the laminate 57 can be cut or not be cut as required.

The laminating apparatus 1 can support the paper 5 having a length larger than the Y-axis length (about 90 mm corresponding to the length of a business card) defined between the paper supply roller pair 50 and a press roller pair 54 constructed of a press roller 53 and a driven roller 55. On the other hand, the X-axis sensor 39 can detects the X-axis length of the paper in a range of 55–216 mm while the arm 43 scans in the X-axis direction. Accordingly, the laminating apparatus 1 can support the paper 5 having the size of 55–216 mm in X-axis length and 90 mm or more in Y-axis length.

Next, the structure of the laminating apparatus 1 in the second embodiment will be described with reference to FIG. 10. FIG. 10 is a block diagram of a control system of the apparatus 1.

As shown in FIG. 10, the laminating apparatus 1 is controlled by the following elements connected to a CPU 83 through a bus 81: a control panel 11 provided with a power switch 17, a manual cutting button 19, a manual feeding button 21, and a start-stop button 23 and others; a ROM 71 storing various programs such as a laminate formation processing program for commanding operations of each element, the program being executed at automatic formation of a laminate 57 according to the size of the paper 5 in response to start or stop of an automatic formation mode which is commanded by means of the start-stop button 23; a drive motor 75 for providing a driving power to the paper supply roller pair 50, the press roller pair 54, and a discharge roller pair 60 constructed of a discharge roller 59 and a driven roller 61; a timer 73 for counting times; a speaker 77 for informing a user of various errors and various receptions of inputs by ringing or sounding; an LED 79 for informing a user of various errors and various receptions of inputs by lighting up or blinking; the X-axis sensor 39 for detecting the presence or absence of paper 5 and the X-axis length thereof; the Y-axis sensor 69 for detecting the presence or absence of paper 5 and the Y-axis length thereof; the cassette discrimination sensor 47 for discriminating the X-axis length of the sheet cassette 31; and the sheet discrimination sensor 87 for discriminating the rotational condition of the first sheet roll 65 and the type or the like of the sheet cassette 31; and so on.

The CPU 83 performs, in addition of control of each element mentioned above, execution of processing; paper size measurement processing for determining the X-axis length of paper 5 from a scan amount (a distance) of the X-axis sensor 39 in the X-axis direction, required to detect the paper 5, and for determining a duration of on-time of the Y-axis sensor 69 and the Y-axis length of paper 5 from a driven amount (the number of rotations) of the paper feed roller 49 driven for the duration of on-time of the sensor 69; and error determination processing for detecting errors based on detection results by the X-axis sensor 39, the Y-axis sensor 69, the cassette discrimination sensor 47, and the sheet discrimination sensor 87 and others in cases where a laminate 57 conformable to the paper size could not be produced.

Instead of a single drive motor 75 which drives the paper feed roller 49, the press roller 53, the paper discharge roller 59, the arm 43, the X-axis cutter 45, and the Y-axis cutter pair 40 and others, a plurality of drive motors may be provided for driving those rollers and others in question.

Next, a laminate formation process that is executed in accordance with the laminate formation processing program stored in the ROM 71 is explained below with reference to the flowcharts in FIGS. 11–14. It is to be noted that the laminate formation processing program is the program used for automatically producing a laminate 57 conformable to the size of the paper 5 to be laminated. This automatic formation processing can be stopped or restarted as required by means of the start-stop button 23. In addition of the automatic formation processing to be commanded with the start-stop button 23, there is provided a function of manually producing a laminate 57 according to user's purposes by means of the manual cutting button 19 and the manual feeding button 21.

It is first determined as to whether the start-stop button 23 on the control panel 11 is pressed by the user to command the start of automatic laminate formation processing (S101). If the button 23 is not pressed (S101:NO), the CPU is set in a standby state until a command to start the laminate formation processing is input by the user (S101:YES). In this standby state, the user may open the top cover 13 of the housing 3 to replace the sheet cassette 31 set in the holding part 32 with another one or to perform maintenance of the apparatus.

If it is detected that a command to start the laminate formation processing has been input with the start-stop button 23 by the user (S101:YES), the paper feed roller 49 is actuated to feed paper 5 so that the top end of the paper 5 can be detected by the Y-axis sensor 69 (S103). Please note that the paper 5 to be laminated is put on the feed tray 7 with the right end (in FIGS. 3 and 4) of the paper 5 in contact with the right sidewall of the tray 7. The Y-axis sensor 69 is therefore disposed in the housing 3 to the right so that the paper 5 having a short X-axis length can be also detected.

When the paper 5 is fed to a position where the Y-axis sensor 69 detects the top end of the paper 5 (S103), then the Y-axis sensor 69 confirms the presence of the paper 5 (S105). If the Y-axis sensor 69 does not detects the presence of the paper 5 (S105:NO), it is determined that no paper 5 on the feed tray 7 by the user. At this time, the speaker 77 and/or the LED 79 inform the user thereof (S107). Thus, the laminate formation processing ends.

Figure 15A:
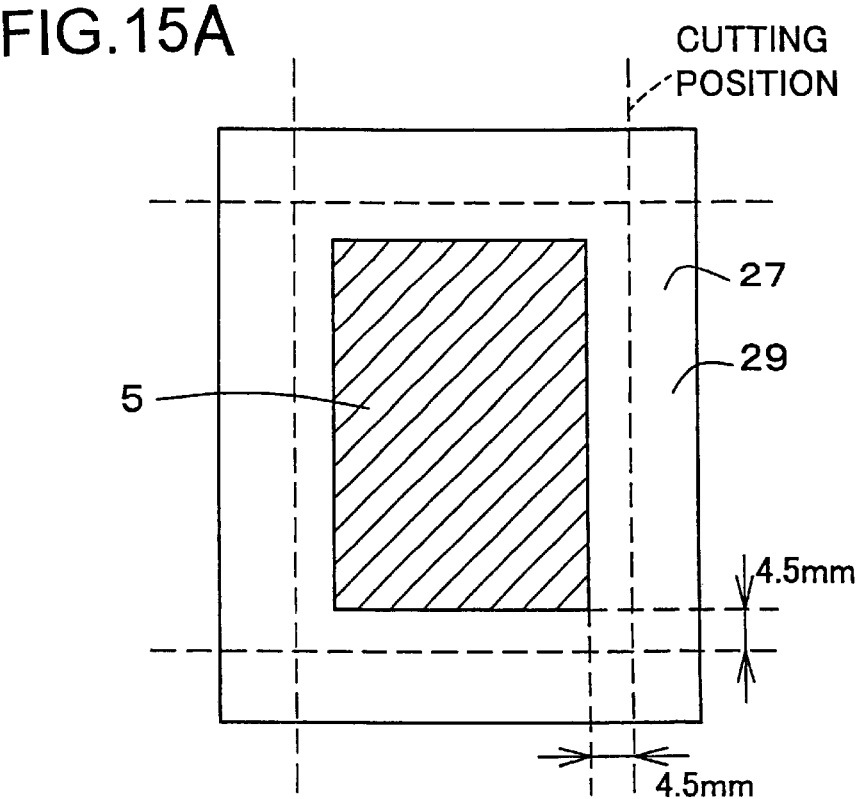
FIG. 15A is an explanatory view of showing cutting positions of a laminate in a margin mode.
Figure 15B:
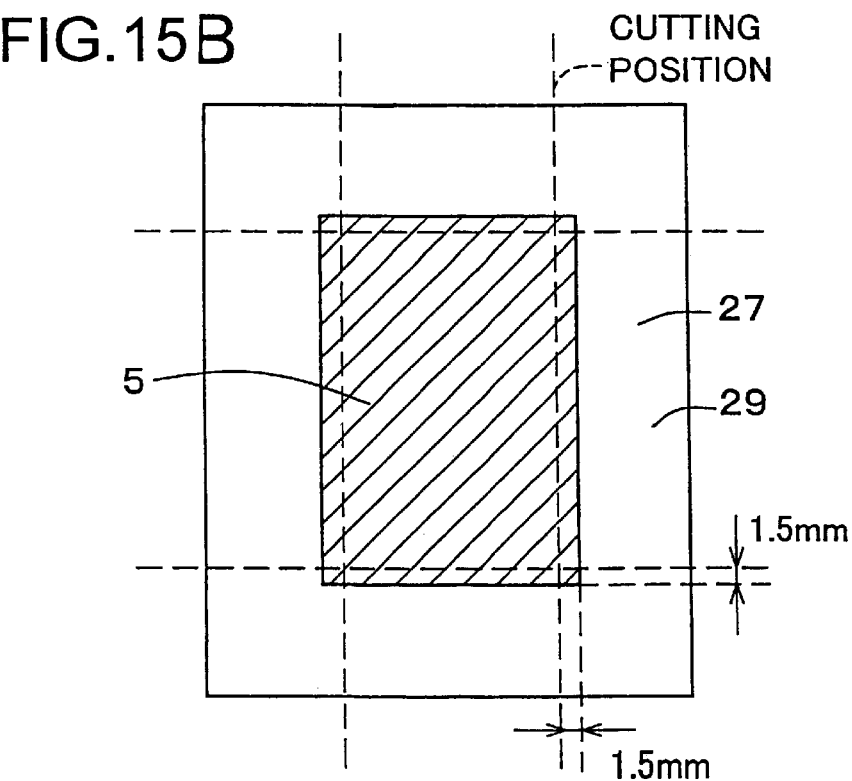
FIG. 15B is an explanatory view of showing cutting positions of a laminate in a non-margin mode.

If the Y-axis sensor 69 detects the presence of the paper 5 (S105:YES), to the contrary, the arm 43 is moved to scan in the X-axis direction, and the X-axis sensor 39 attached to an end of the arm 43 detects the X-axis length of the paper 5 fed by the feed roller 49 (S109). The apparatus 1 in the present embodiment is arranged so that the X-axis sensor 39 can detect the paper 5 having an X-axis length being in a range of 55 mm (about a business card length) to 216 mm (about A4-size paper), which correspond to the size of a laminate producible from the laminating apparatus 1. Also the first Y-axis cutter 41 is provided to the other end of the arm 43. The stop position of the arm 43 in the X-axis direction in S109 corresponds to the down position of the first Y-axis cutter 41. This down position of the cutter 41 is determined in association with cutting modes selected by the cutting mode selecting switch 25. As shown in FIG. 15, specifically, it corresponds to a position for cutting a laminate 57 at the outside of 4.5 mm from the side edge of the paper 5 in a margin mode (see FIG. 15A) and another position for cutting a laminate 57 at the inside of 1.5 mm from the side edge of the paper 5 in a non-margin mode (see FIG. 15B). Similarly, the second Y-axis cutter 42 is moved to a down position by means of a driving mechanism not shown actuated in accordance with the cutting mode selected by the selecting switch 25.

After determination of the X-axis length of the paper 5 in S109, it is determined in S111 as to whether the X-axis length of the paper 5 lies within a predetermined range (55–216 mm). If the length is not within the range (S111:NO), it is determined that the paper 5 put on the feed tray 7 by the user has a size out of the size of a laminate producible from the apparatus 1. The speaker 77 and/or the LED 79 are actuated to inform to the effect to the user (S113), and the laminate formation processing ends.

To the contrary, if it is determined that the X-axis length of the paper 5 lies within the predetermined range (S111:YES), then the X-axis length of the first and second sheets 27 and 29 accommodated in the cassette 31 is detected through the cassette discrimination sensor 47 (S115). Thereafter, a determination is implemented on the relationship between the X-axis length of the sheets 27, 29 and that of the paper 5 detected in S9 (S117).

In S117, if the X-axis length of the paper 5 is decided to be longer than that of the sheets 27, 29 (S117:NO), it is decided that the formation of a laminate 57 is not enabled because the X-axis length of the paper 5 put on the tray 7 by the user is longer than that of the sheets 27, 29 accommodated in the cassette 31. The speaker 77 and/or the LED 79 are then actuated to inform to the effect to the user (S113). Thus, the laminate formation processing ends.

To the contrary, if the X-axis length of the paper 5 is decided to be shorter than that of the sheets 27, 29 (S117:YES), it is determined whether the Y-axis length of the paper 5 is equal to or larger than the minimum length (90 mm) in the Y-axis direction of a laminate producible from the apparatus 1. For that purpose, the feed roller 49 is actuated to feed the paper 5 so that a distance between the top end of the paper 5 and the X-axis sensor 39 becomes equal to that minimum Y-axis length (S119). After such the actuation of the feed roller 49, a determination is made as to whether the paper 5 is detected through the X-axis sensor 39 (S121). If the X-axis sensor 39 does not detect the paper 5 (S121:NO), it is determined that the formation of a laminate 57 is not enabled because the Y-axis length of the paper 5 is not correspondent with the minimum Y-axis length or more. The speaker 77 and/or the LED 79 are actuated to inform to the effect to the user (S122), and the laminate formation processing ends.

In S121, on the other hand, if the X-axis sensor 39 detects the paper 5 (S121:YES), a determination is made as to whether a cutting mode has been changed by the cutting mode selection switch 25 (S123) during processes from S109 to S121. When the cutting mode has been changed (S123:YES), the arm 43 is moved to scan in accordance with the selected cutting mode, thereby changing the down position of the first Y-axis cutter 41 (S125). Simultaneously, the same change is executed on the down position of the second Y-axis cutter 43.

If the cutting mode is not changed (S123:NO), alternatively, if the down position of the Y-axis cutter pair 40 has been changed in response to the change in the cutting modes (S125), the feed roller 49 is actuated until the paper 5 is fed so that the top end thereof reaches the nipping position between the press roller pair 54 (S127). Thereafter, the press roller 53 is actuated to feed the laminate 57 so that the top end thereof reaches the position where the Y-axis cutter pair 40 is moved down (S129) and the cutter pair 40 is moved down at that position to cut out both sides of the laminate 57 from the top end thereof (S131).

In the process subsequent to S131, the press roller 53 is further actuated to feed the laminate 57 to a position where the top end portion of the laminate 57 is cut by means of the X-axis cutter 45 (S133), thereby allowing the Y-axis cutter pair 40 to cut both sides in the X-axis direction of the laminate 57 along the Y-axis. Then, the press roller 53 is stopped and the X-axis cutter 45 is caused to scan, cutting the top end portion of the laminate 57 (S135). It is to be noted that the position of the cutter 45 to cut the top end portion of the laminate 57 is determined in association with the cutting mode selected by the cutting mode selecting switch 25. As shown in FIG. 15, specifically, it corresponds to a position for cutting the laminate 57 at the outside of 4.5 mm from the top edge of the paper 5 in a margin mode (see FIG. 15A) and another position for cutting a laminate 57 at the inside of 1.5 mm from the top edge of the paper 5 in a non-margin mode (see FIG. 15B).

After the processing in S135, the press roller 53 is actuated again (S137), and a determination is made as to the presence of paper 5 by means of the Y-axis sensor 69 (S139). If the presence of the paper 5 is detected (S139:YES), it is determined that the bottom end of the paper 5 has not fully come yet in the housing 3. In this case, that processing is continued. On the other hand, a determination is also made based on the on-time of the Y-axis sensor 69 as to whether the Y-axis length of the paper 5 reaches 350 mm or more (S141). If the Y-axis length of the paper 5 is not 350 mm or more (S141:NO), sequentially, a determination is made as to whether the first and second sheets 27 and 29 are fed erroneously, based on detection results by the sheet discrimination sensor 87 (S143). If the sheets 27 and 29 are fed accurately (S143:NO), the flow returns to S139.

In S141, if it is decided that the Y-axis length of the paper 5 exceeds 350 mm (S141:YES), which indicates that the sensor 69 might be erroneously kept in an on-state due to any causes, the press roller 53 is temporarily stopped to halt the automatic formation of the laminate 57. For urging the user to check whether errors occur, the speaker 77 and/or the LED 79 are actuated to inform to the effect to the user (S145), and this laminate formation processing ends.

In S143, if it is detected that the sheets 27, 29 are erroneously fed (S143:YES), which indicates that the sheets 27, 29 have been fully exhausted or there are any causes whereby normal feeding (unreeling) of the sheets 27, 29 might be inhibited, the speaker 77 and/or the LED 79 are actuated to inform to the effect to the user (S147). This laminate formation processing ends.

In S139, on the other hand, if no paper is detected by the Y-axis sensor 69 (S130:NO), it is decided that the bottom end of the paper 5 has fully come in the housing 3. The press roller 53 is actuated to feed the laminate 57 until the bottom end thereof comes to the position of the Y-axis cutter (the position at which the Y-axis cutter will be lifted up) (S149).

Thereafter, a determination is made as to whether the bottom end of the laminate 57 has come to the position of the Y-axis cutter and the press roller 53 has been stopped (S151). If the roller 53 has not been stopped (S151:NO), it is then detected whether the presence of another paper 5 is detected by the Y-axis sensor 69 (S153). It is to be noted that if the sensor 69 detects another paper 5 (S153:YES), the flow returns to S137. This enables continuous processing even when paper 5 is sequentially supplied.

In S153, if the sensor 69 does not detects another paper 5 (S153:NO), a decision is made on whether the first and second sheets 27 and 29 are erroneously fed based on detection results by the sheet discrimination sensor 87 (S155). If the sheets are fed normally (S155:NO), the flow returns to S151 again. In S155, if it is decided that the sheets 27, 29 are erroneously fed (S155:YES), which indicates that the sheets 27, 29 have been fully exhausted or there are any causes whereby normal feeding of the sheets 27, 29 might be inhibited, the speaker 77 and/or the LED 79 are actuated to inform to the effect to the user (S157). This laminate formation processing ends.

In S151, meanwhile, if it is determined that the bottom end of the laminate 57 has come to the up position of the Y-axis cutter and the press roller 53 has been stopped (S151:YES), the Y-axis cutter pair 40 is caused to move up (S159), actuation of the press roller 53 is restarted to feed the laminate 57 so that the bottom end thereof reaches the X-axis cutter scanning position (S161).

Then, a determination is made as to whether the bottom and of the laminate 57 has come to the X-axis cutter scanning position and the press roller 53 is stopped (S163). If not (S163:NO), based on detection results by the Y-axis sensor 69, it is determined as to whether or not the presence of another paper 5 is detected (S165). In this processing S165, if another paper 5 is detected (165:YES), the Y-axis cutter pair 40 is moved down again (S167), and the flow returns to S137. This efficiency supports continuous supply of paper 5.

In S165, to the contrary, if another paper 5 is not detected by the sensor 69 (S165:NO), a subsequent determination is made based on detection results by the sheet discrimination sensor 87 as to whether the sheets 27, 29 are erroneously fed (S169). If the sheets 27, 29 are normally fed (S169:NO), the flow returns to S163 again. In S169, if it is detected that the sheets 27, 29 are erroneously fed (S169:YES), which indicates that the sheets 27, 29 have been fully exhausted or are not normally unreeled due to any causes, the speaker 77 and/or the LED 79 are actuated to inform to the effect to the user (S171). Then, this laminate formation processing ends.

In S163, meanwhile, it is detected that the bottom end of the laminate 57 has come to the X-axis cutter scanning position and the press roller 53 has been stopped (S163:YES), the X-axis cutter 45 is moved to scan (S173). Then, the discharge roller 59 is actuated to transport the laminate 57 until the bottom end thereof comes to the discharge part 63, thereby discharging the laminate 57 outside (S175), while the arm 43 returns to an initial position (S177). Thus, this laminate formation processing ends. It is to be noted that the position of the bottom end of the laminate 57 to be cut by the cutter 45 is determined in association with the cutting mode selected by the cutting mode selecting switch 25. As shown in FIG. 15, specifically, it corresponds to a position for cutting the laminate 57 at the outside of 4.5 mm from the bottom edge of the paper 5 is a margin mode (see FIG. 15A) and another position for cutting a laminate 57 at the inside of 1.5 mm from the bottom edge of the paper 5 in a non-margin mode (see FIG. 15B).

In the process of the above processing, if errors occur (S107, S113, S122, S145, S147, S157, and S171), actuation of the feed roller 49, the press roller 53, and the discharge roller 59 is stopped to temporarily halt the automatic formation of the laminate 57. In this manner, even while the formation of the laminate 57 is temporarily stopped by press of the start-stop button 23 or due to various errors, the following operations are enabled: restarting the formation of the laminate 57 by press of the start-stop button 23; transporting the laminate 57 by a length required by the user by press of the manual feeding button 21; and cutting the laminate 57 in the X-axis direction by press of the manual cutting button 19.

As described above, the laminating apparatus 1 in the second embodiment needs no handle or the like to be manually operated by a user while the user visually confirms all the steps of producing a laminate 57. In addition, the apparatus 1 provided with the Y-axis sensor 69 and the X-axis sensor 39 enables the formation of a laminate 57 conformable to the size of paper 5. This can remove the need to cut the laminated sheets 27, 29 that unnecessarily lie off the edge of the paper 5 with scissors or a cutter, thus resulting in a reduction in labors and loads which would be exerted on the user.

The X-axis sensor 39 and the first Y-axis cutter 41 can be moved to scan in the X-axis direction of the paper 5 (S109). This makes it possible to set the cutting portion by the first Y-axis cutter 41 on the basis of the position where the paper 5 is detected by the X-axis sensor 39. Accordingly, the presence of paper 5 in the X-axis direction and the cutting position by the fist Y-axis cutter 41 to the laminate 57 can be efficiently detected.

Furthermore, based on the detection results by the X-axis sensor 39 and the cassette discrimination sensor 47, if it is determined that the formation of the laminate 57 is disabled because the X-axis length of the first and second sheets 27, 29 is shorter than that of the paper 5 (S117:NO), feeding of the paper 5 by the feed roller 49 is stopped (S113). This can prevent clogging of the paper 5 in the apparatus 1 or formation of defective laminates.

After the paper 5 is fed by the minimum Y-axis length (about 90 mm) (S119), if the X-axis sensor 39 arranged upstream in the Y-axis direction from the feed roller 49 does not detect the paper 5 (S121:NO), it is decided that the formation of a laminate 57 is disabled due to the too shorter Y-axis length of the paper 5. Further feeding of the paper 5 by the roller 49 is stopped (S122), so that clogging of the paper 5 in the apparatus 1 or formation of defective laminate can be prevented.

Even when the Y-axis sensor 69 can not normally detect the paper 5 due to any troubles, the press roller 53 is stopped (S145) after feeding the paper 5 by a predetermined Y-axis length (about 350 mm) (S141:YES). This can prevent continuous formation of laminates 57 which would be caused by detection failure of the Y-axis sensor 69. The wasteful consumption of the sheets 27, 29 can be prevented accordingly.

Figure 16:
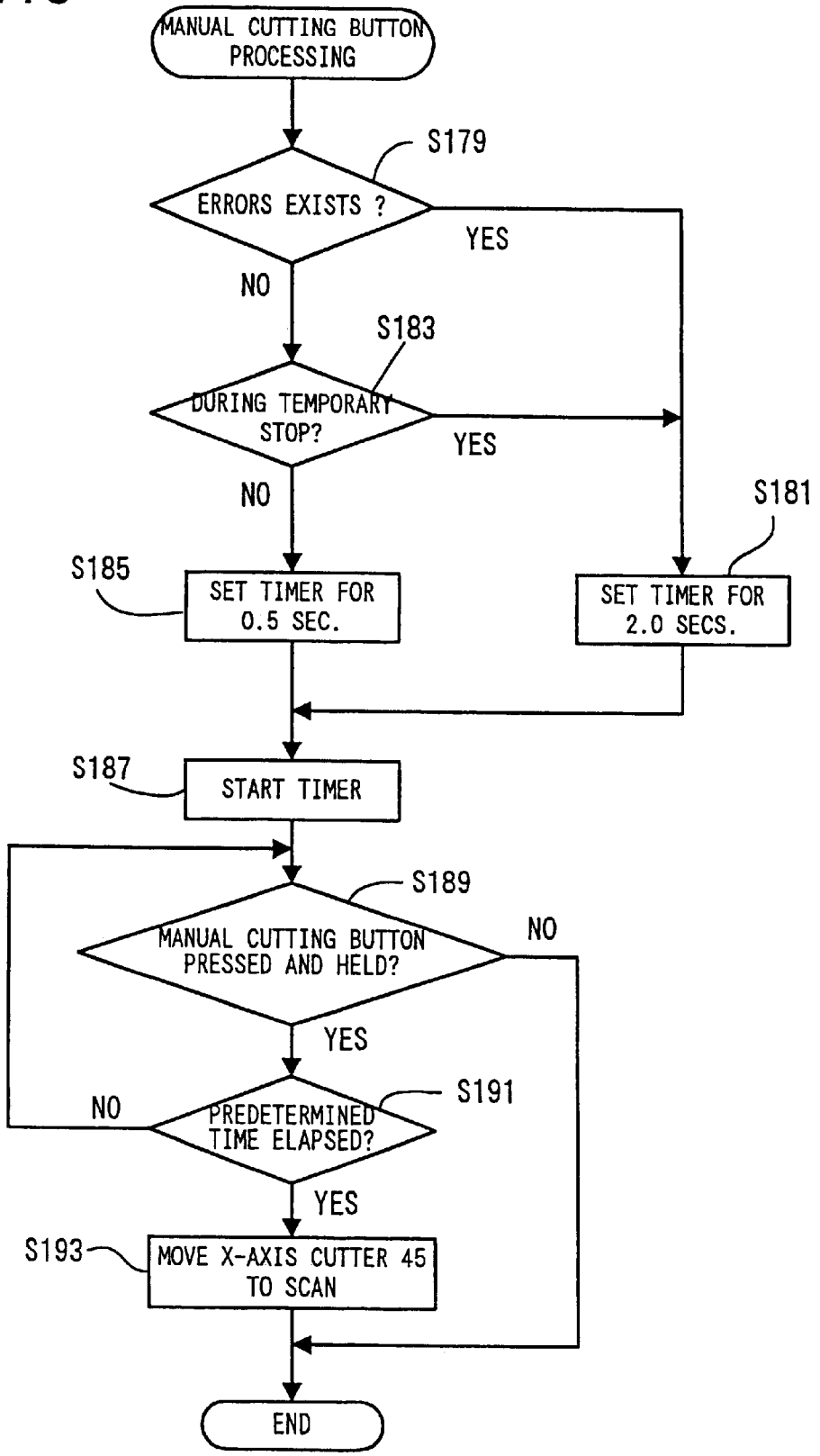
FIG. 16 is a flowchart of steps of manual cut processing.

Next, the main cutting button processing is described below with reference to FIG. 16. This processing is executed in the automatic or manual formation of the laminate 57 for cutting the laminate 57 in the X-axis direction by means of the manual cutting button 19 while the feed roller 49, the press roller 53, and the discharge roller 59 are stopped.

Upon press of the manual cutting button 19, the manual cutting button processing is started and a determination is made as to whether an error condition exists in the laminating apparatus 1 (S179). If an error exists (S179:YES), the time to be counted by the timer 73 is set for 2.0 seconds (S181). If no error exists (S179:NO), a determination is made as to whether the apparatus 1 is under condition that the automatic formation of the laminate 57 is temporarily stopped by press of the start-stop button 23 during the automatic formation mode (S183). If the automatic formation is temporarily halted (S183:YES), the timer 73 is set for 2.0 sec (S181). If no error exists (S179:NO) and the automatic formation of the laminate 57 is not temporarily stopped (S183:NO), the timer 73 is set for 0.5 sec (S185).

After the time to be counted by the timer 73 is set in the process in S181 or S185, the timer 73 is actuated to start counting the time (S187). Simultaneously, a determination is made as to whether the manual cutting button 19 is continuously kept in a pressed condition (S189). If the button 19 is not continuously pressed (S189:NO), it is determined that the cutting of the laminate 57 is not commanded by the button 19. This manual cutting button processing ends.

In S189, if it is detected that the button 19 is continuously kept in a pressed condition (S189:YES), a detection is made as to whether the duration of press of the button 19 reaches the time set in S181 or S185 (S191). If the duration of button press time does not reach the set time (S191:NO), the flow returns to S189 again.

In S191, to the contrary, if the press duration reaches the set time (S191:YES), it is decided that the cutting of the laminate 57 is commanded by means of the button 19. The X-axis cutter 45 is then actuated to scan to cut the laminate 57 (S193). The manual cutting button processing is thus completed.

As described above, the laminating apparatus in the second embodiment is arranged such that while the feed roller 49 and the press roller 53 are stopped by means of the start-stop button 23, the duration of continuous press of the button 19 required for commanding the cutting of the laminate 57 by the X-axis cutter 45 is set for a longer one. This consequently makes it possible to prevent the occurrence of a problem that the laminate 57 may be cut through the carelessness of a user during temporary stop of the automatic formation of the laminate 57. On the other hand, while the rollers 49 and 50 are stopped by means of the manual feeding button 21, the duration of continuous press of the button 19 required for commanding the cutting of the laminate 57 by the x-axis cutter 45 is set for a shorter one. This can prevent the occurrence of a problem that the cutting of the laminate 57 could not promptly be performing during the manual formation of the laminate 57.

When the formation of the laminate 57 is stopped due to any errors, the duration of continuous press of the button 19 required for commanding the cutting of the laminate 57 by the x-axis cutter 45 is set for a longer one. This makes it possible to urge the user to appropriately determine or check the errors. When the formation of the laminate is stopped while no error exists, the continuous press duration is set for a shorter one, thereby effectively solving a problem that the cutting of the laminate 57 could not promptly be performed during normal stop of production.

Furthermore, a simple configuration of variously setting the continuous press duration of the button 19 can provide different commanding manners to cut the laminate 57, and can prevent a problem that the laminate 57 may be cut carelessly or involuntarily in a state that it should not be cut.

Figure 17:
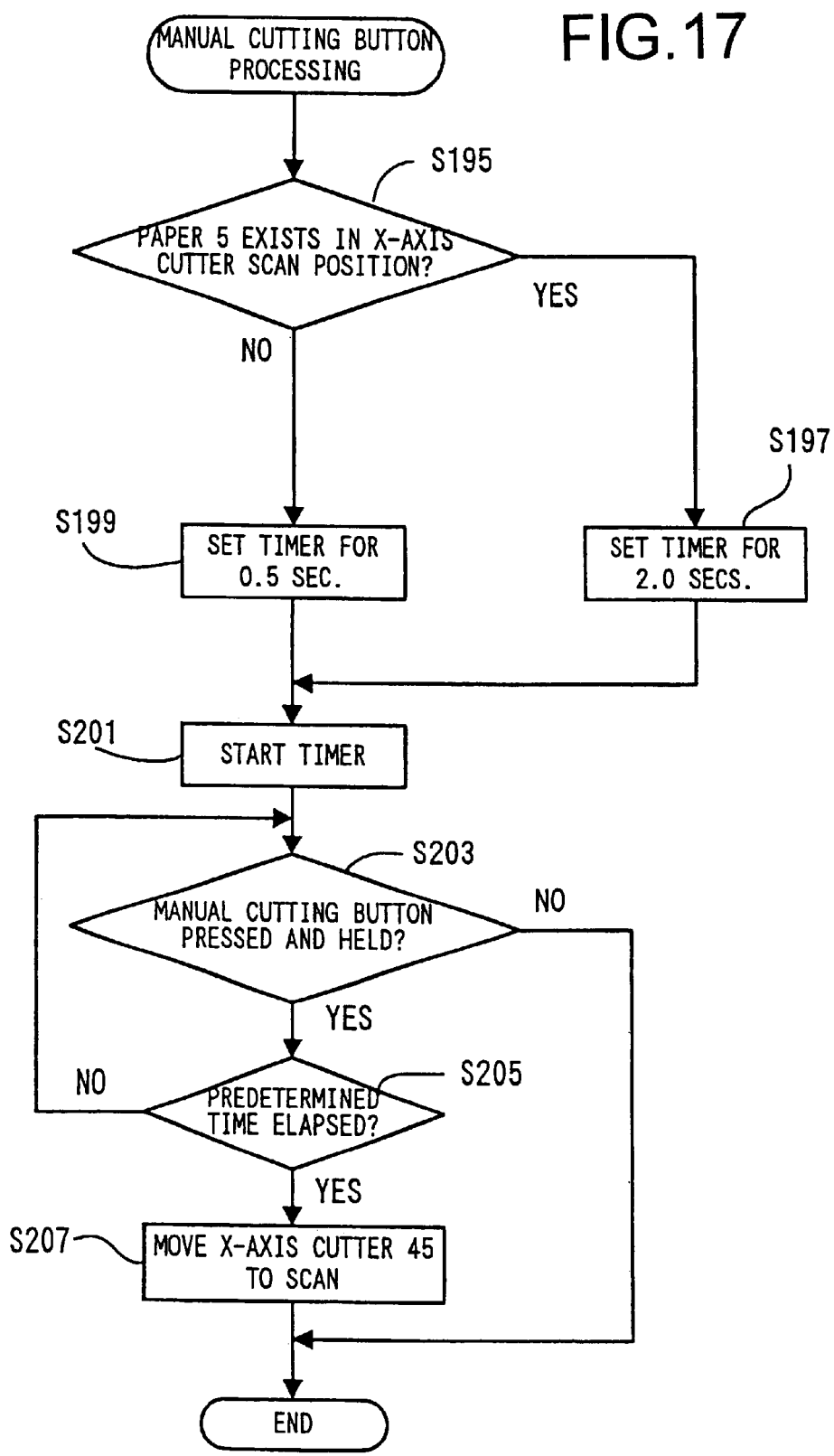
FIG. 17 is a flowchart of steps of manual cut processing in another embodiment.
Figure 18A:
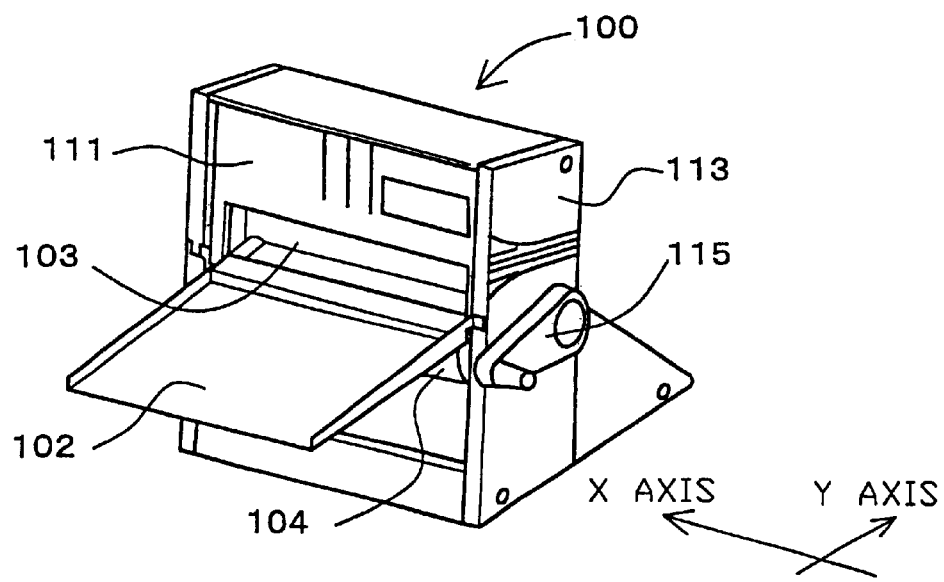
FIG. 18A is a perspective front view of a laminating apparatus in a prior art.
Figure 18B:
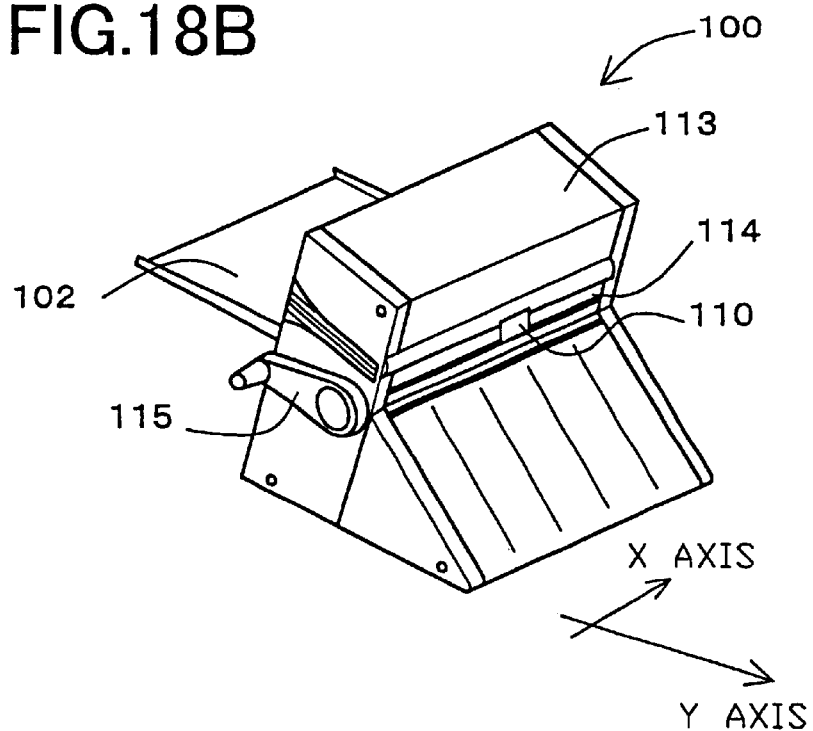
FIG. 18B is a perspective back view of the apparatus in FIG. 18b.
Figure 19:
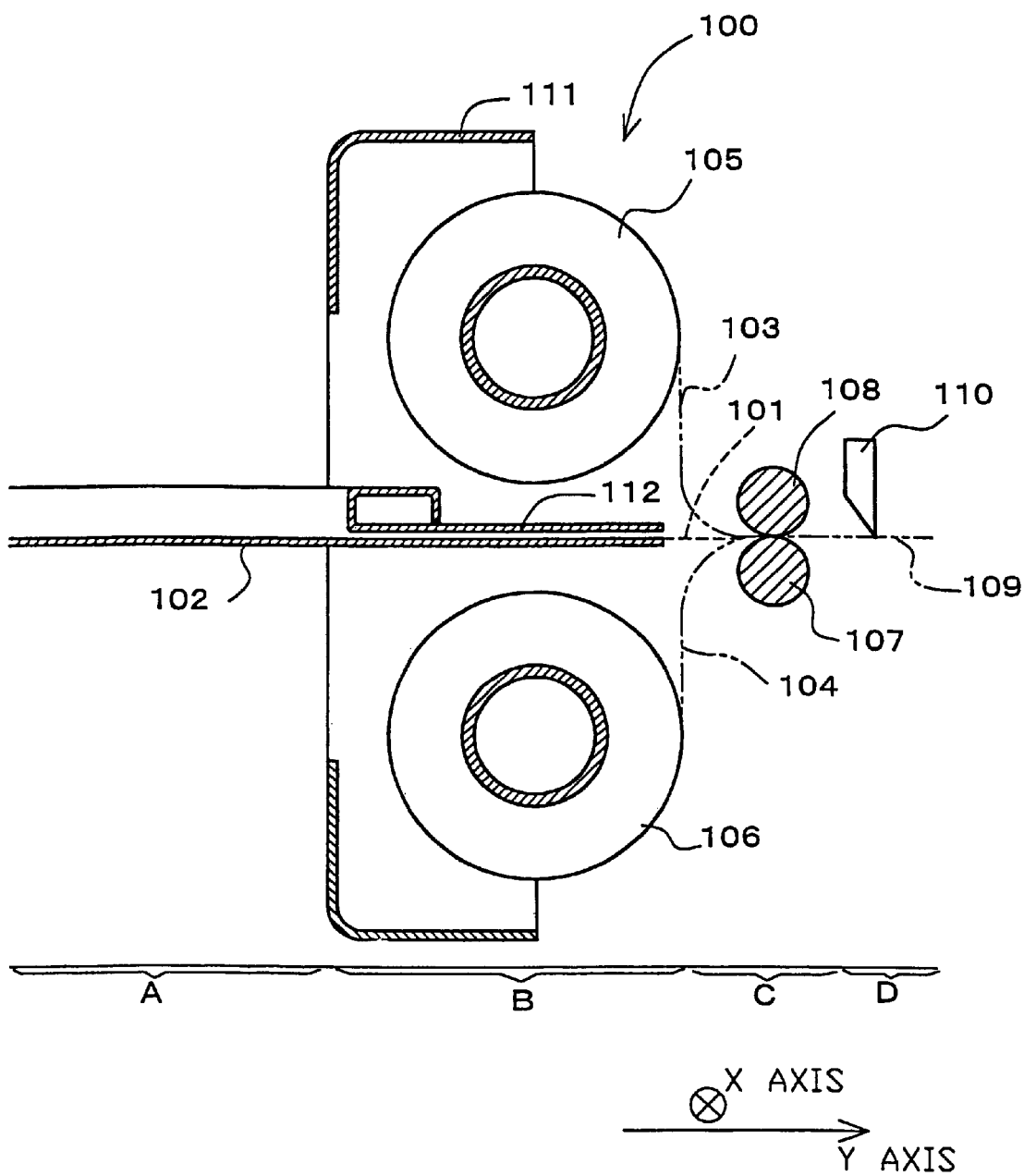
FIG. 19 is a schematic side sectional view of the apparatus in the prior art.

Next, another embodiment of the manual cutting button processing mentioned above will be described with reference to FIG. 17. The manual cutting button processing in the following embodiment is substantially the same as that in the above embodiment. A different point therebetween is that a different process of setting a duration of continuous press of a manual cutting button used for the cutting of a laminate 57. This is described below in detail.

Upon press of the manual cutting button 19, starting the manual cutting button processing, the CPU 83 calculates the position of the paper 5 based on detection results by the Y-axis sensor 69, thereby to determine whether the paper 5 exists in the position to be scanned by the X-axis cutter 45 (S195). If the presence of the paper 5 is detected in that position (S195:YES), the time to be counted by the timer 73 is set for 2.0 sec (S197). If the absence of the paper 5 is detected (S195:NO), the timer 73 is set for 0.5 sec (S199).

The subsequent steps in S201–207 are executed in the same manner as the steps in S187–193 mentioned above, and the explanation thereof is omitted.

As described above, the laminating apparatus 1 in this embodiment is arranged such that when the presence of the paper 5 in the cutting position of the laminate 57 by the X-axis cutter 45 is detected, the continuous press duration of the manual cutting button 19 is set for a longer one. At the cutting of the laminate 57 by the cutter 45, therefore, careless cutting of the paper 5 lying in the cutter position by the cutter 45 can be prevented. When the absence of the paper 5 in the cutting position is detected, the continuous press duration is set for a shorter one. The cutting of the laminate 57 can be promptly conducted, thus solving a problem that the cutting of the laminate 57 by the cutter 45 could not be executed even though the paper 5 does not exist in the cutting position of the laminate 57.

A simple structure that the duration of pressing the manual cutting button 19 is differently set can provide different commanding manners to cut the laminate 57. It is furthermore possible to prevent a problem that the laminate 57 may carelessly be cut even though it should not be cut.

The present invention may be embodied in other specific forms without departing from the spirit or essential characteristics thereof. For instance, the second embodiment exemplifies the case where the speaker 77 and/or the LED 79 are actuated to inform the user of the temporary stop of the automatic laminate formation or the occurrence of errors, but it is not limited thereto. The control panel 11 may be provided with a liquid crystal display for visually informing the user of the temporary stop of the automatic laminate formation or the occurrence of errors in images such as letters, pictures, and so on.

In the first and second embodiments, the roller pairs 50, 54, 60 each of which is constructed of a pair of vertically aligned rollers are used as a feeding device to feed the paper 5 and the laminate 57. Those may be replaced with another feeding device if only it can smoothly feed the paper 5 and the laminate 57. For example, a structure of a roller and a roller contact member can provide the same effect.

The above embodiments exemplify the apparatus in which the first Y-axis cutter 41 and the X-axis sensor 39 are connected through the arm 43 so that the laminate cutting position by the cutter 41 is determined based on the detection result on the paper 5 by the sensor 39. Instead of this, another configuration may be used that the paper guide 9 is connected with the first Y-axis cutter 41 so that the laminate cutting position by the cutter 41 based on the position of the guide 9 in the X-axis direction.

The second embodiment exemplifies the apparatus in which a determination is made through the Y-axis sensor 69 as to whether the paper 5 is fed by a predetermined Y-axis length or more (S141). The same effect can be obtained if such the determination is made through the X-axis sensor 39.

The second embodiment exemplifies the apparatus in which the X-axis sensor 39 is disposed upstream from the feed roller 49 in the Y-axis direction, while the Y-axis sensor 69 is disposed downstream from the same, but it is not limited thereto. It is sufficient if only at least one of the sensors 39 and 69 is disposed upstream from the roller 49 in the Y-axis direction. Accordingly, if the paper 5 has a length that is so shorter in the Y-axis direction that the apparatus 1 can not support, the paper 5 can be prevented from being fed into the housing of the apparatus 1 by actuation of the feed roller 49. This can also provide the same effect as in the above embodiments.

Although, in the first and second embodiments described above, the sheets are laminated on both sides of the paper and the laminate is formed, it may be conceivable that the sheet is laminated on one side of the paper and the laminate is formed.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A laminating apparatus for producing a laminate by unreeling sheet from a sheet roll containing long lengths of rolled sheet, and laminating the unreeled sheet on a document medium, while feeding the laminated sheet and document medium, the apparatus including:
    a controller for controlling the laminating apparatus;
    a power supply part for supplying power to the controller;
    a sheet roll holding part for holding the sheet roll;
    a sheet roll detecting part for detecting mounting and dismounting of the sheet roll with respect to the sheet roll holding part;
    a first flag memory that is set when the power supply part starts supplying power to the controller;
    a second flag memory that is set when the sheet roll detecting part detects the mounting and dismounting of the sheet roll; and
    a slack removing device that performs a slack removing operation to remove slack generated in the sheet unreeled from the sheet roll only if the first or second flag memory has been set.

2. The laminating apparatus according to claim 1, wherein the slack removing device includes a pair of rollers disposed downstream from the sheet roll holding part along a direction of feeding the laminate.

3. The laminating apparatus according to claim 2 further including:
    a cover for opening and closing the sheet roll holding part;
    a cover switch for detecting opening and closing of the cover;
    wherein the sheet roll detecting part detects the mounting and dismounting of the sheet roll when an open state of the cover is detected by the cover switch.

4. The laminating apparatus according to claim 3, wherein the sheet roll detecting part includes a sensor disposed downstream from the rollers along the laminate feeding direction, and a detection state of the sensor is changed when the sensor detects presence of tip end of the sheet held between the rollers.

5. The laminating apparatus according to claim 1, wherein when the detection state of the sensor is changed, the sheet roll detecting part determines that the mounting and dismounting of the sheet roll was made.

6. The laminating apparatus according to claim 2 further including:
    an encoder member provided with a predetermined slit pattern and attached to a side end of the sheet roll; and
    an encoder detecting part for detecting the slit pattern of the encoder member during rotation of the sheet roll to generate a predetermined detection signal;
    wherein when the detection signal is detected by the encoder detecting part, the slack removing device stops actuation of the rollers to terminate a slack removing operation with respect to the sheet roll.

7. The laminating apparatus according to claim 6, wherein when the predetermined detection signal is not generated from the encoder detecting part, the slack removing device feeds the sheet by a predetermined amount by the rollers and stops actuation of the rollers to terminate the slack removing operation with respect to the sheet roll.

8. The laminating apparatus according to claim 1 further including:
    a power switch for powering on or off the laminating apparatus; and
    a plug for connecting the power supply part with an outlet of a utility power source;
    wherein the power supply part supplies power to the controller when the plug is connected with the outlet of the utility power source,
    during power supply through the power supply part to the controller, the second flag memory is set when the sheet roll detecting part detects that the mounting and dismounting of the sheet roll is made, and the slack removing device performs the slack removing operation only if the first or second flag memory has been set at a time when the laminating apparatus is powered by the power switch.

9. The laminating apparatus according to claim 8 further including release means for releasing setting of the first or second flag memory after the slack removing operation is performed by the slack removing device with respect to the sheet roll;

wherein when the laminating apparatus is powered on by the power switch subsequently to powering-off during power supply through the power supply part to the controller, the setting of the first or second flag memory is released by the release means, and the slack removing device does not perform the slack removing operation with respect to the sheet roll.

10. The laminating apparatus according to claim 1 further including:

a document medium feeding part for supplying the document medium into a main body of the laminating apparatus;

a laminate feeding part for laminating the sheets on both faces of the document medium to form a laminate while feeding the laminate in a predetermined feeding direction;

a first detecting part disposed near the document medium feeding part, for detecting presence of the document medium fed by the document medium feeding part;

a first cutting part disposed downstream from the laminate feeding part along the feeding direction, the first cutting part being movable in a direction of a width of the laminate form, perpendicular to the feeding direction, to determine a cutting position of the laminate, and the first cutting part cutting the laminate in the feeding direction;

a second cutting part disposed downstream from the laminate feeding part along the feeding direction, the second cutting part setting a cutting position of the laminate based on a detection result of the first detecting part and cutting the laminate in the width direction; and at least a drive motor for actuating the document medium feeding part, the laminate feeding part, and the second cutting part.

11. The laminating apparatus according to claim 10 further including a second detecting part disposed near the document medium feeding part, for detecting presence of the document medium in the width direction thereof;

wherein the first cutting part sets the cutting position of the laminate by actuating the drive motor based on a detection result of the second detecting part.

12. The laminating apparatus according to claim 11 further including a connecting member for connecting the second detecting part with the first cutting part;

wherein the second detecting part and the first cutting part are moved together when the connecting member is moved in the width direction of the document medium.

13. The laminating apparatus according to claim 11 further including:

a recognizing part for recognizing a length of the sheets in the width direction; and a judging part for judging whether production of the laminate is enabled by comparing the width of the document medium detected by the second detecting part and the width of the sheets recognized by the recognizing part.

14. The laminating apparatus according to claim 13, wherein at lest one of the first and second detecting parts is disposed upstream from the document medium feeding part along the feeding direction, and judging part judges whether the production of the laminate based on the detection result of the first or second detecting part with respect to the document medium when the document medium is fed by a first feeding amount by the document medium feeding part.

15. The laminating apparatus according to claim 14, wherein when the first or second detecting part detects presence of the document medium when the document medium is fed by a second feeding amount that is larger than the first feeding amount, the document feeding part and the laminate feeding part are stopped operating.

16. The laminating apparatus according to claim 10 further including:

a manual feeding command part for selectively commanding start and stop of actuation of the document medium feeding part and the laminate feeding part; and a manual cutting command part for commanding cutting of the laminate with the second cutting part while the document medium feeding part and the laminate feeding part are stopped operating by means of the manual feeding command part.

17. The laminating apparatus according to claim 16 further including:

an automatic formation mode in which the drive motor is controlled to start and stop of actuation of at least the document medium feeding part, the laminate feeding part, and the second cutting part, performing start to end of formation of the laminate to automatically produce the laminate conformable to a length and width of the document medium; and a manual formation mode in which the document medium feeding part and the laminate feeding part are started or stopped operating by means of the manual feeding command part, and the second cutting part is operated by means of the manual cutting command part to cut the laminate while the document medium feeding part and the laminate feeding part are stopped operating, thereby to manually produce the laminate based on commands from the manual feeding command part and the manual cutting command part.

18. The laminating apparatus according to claim 17 further including an automatic formation command part for commanding stop or restart of the automatic laminate formation during the start-to-end of laminate formation in the automatic formation mode;

wherein the manual cutting command part commands the second cutting part to cut the laminate in different manners between a first state where the document medium feeding part and the laminate feeding part are stopped by means of the automatic formation command part in the automatic formation mode and a second state where the document medium feeding part and the laminate feeding part are stopped by means of the manual feeding command part in the manual formation mode.

19. The laminating apparatus according to claim 18 further including a timer for counting a duration of a command given by the manual cutting command part;

wherein the manual cutting command parts sets the duration to command the second cutting part to cut the laminate, the duration being different between the first and second states.

20. The laminating apparatus according to claim 19, wherein the command duration is set longer in the first state, while shorter in the second state.

21. The laminating apparatus according to claim 16 further including an error judging part for stopping actuation of the document medium feeding part and the laminate feeding part by determining that an error exists in laminate formation based on a judgement that information of the laminate conformable to a length and width of the document medium is disabled when the drive motor is driven to actuate the document medium feeding part, the laminate feeding part, and the second cutting part to produce the laminate form;

wherein the manual cutting command part commands the second cutting part to cut the laminate in different manners based on a judgment result of the error judging part as to whether or not the error exists.

22. The laminating apparatus according to claim 21 further including a timer for counting a duration of a command given by the manual cutting command part;

wherein the manual cutting command part sets the duration to command the second cutting part to cut the laminate form, the duration being different according to the judgement result of the error judging part as to whether the error exists.

23. The laminating apparatus according to claim 22, wherein the command duration is set longer when the error judging part determines that the error exists, while shorter when it determines that no error exists.

24. The laminating apparatus according to claim 16, wherein the manual cutting command part commands the second cutting part to cut the laminate in different manners between a third state where the document medium exists in the cutting position of the laminate with the second cutting part and a fourth state where the document medium does not exist in that position, based on a detection result of the first or second detecting part as to presence or absence of the document medium during stop of the document medium feeding part and the laminate feeding part by means of the manual feeding command part.

25. The laminating apparatus according to claim 24 further including a timer for counting a duration of a command given by the manual cutting command part;

wherein the manual cutting command part sets the duration to command the second cutting part to cut the laminate form, the duration being different between the third and fourth states.

26. The laminating apparatus according to claim 25, wherein the command duration is set longer in the third state, while shorter in the fourth state.

\* \* \* \* \*